US011108471B2

(12) United States Patent
Abdi

(10) Patent No.: US 11,108,471 B2
(45) Date of Patent: Aug. 31, 2021

(54) SYSTEM AND METHOD FOR DATA TRANSMISSION VIA ACOUSTIC CHANNELS

(71) Applicant: Ali Abdi, Short Hills, NJ (US)

(72) Inventor: Ali Abdi, Short Hills, NJ (US)

( * ) Notice: Subject to any disclaimer, the term of this patent is extended or adjusted under 35 U.S.C. 154(b) by 0 days.

(21) Appl. No.: 16/695,086

(22) Filed: Nov. 25, 2019

(65) Prior Publication Data

US 2020/0186259 A1 Jun. 11, 2020

Related U.S. Application Data

(63) Continuation-in-part of application No. 13/641,895, filed as application No. PCT/US2011/032936 on Apr. 18, 2011, now Pat. No. 10,491,310.

(60) Provisional application No. 61/325,679, filed on Apr. 19, 2010.

(51) Int. Cl.
*H04B 11/00* (2006.01)
*H04B 13/02* (2006.01)

(52) U.S. Cl.
CPC ............. *H04B 11/00* (2013.01); *H04B 13/02* (2013.01)

(58) Field of Classification Search
CPC .......... E21B 47/12; E21B 47/14; E21B 47/18; E21B 47/16; E21B 47/20; E21B 47/22; E21B 47/24; H04B 11/00; H04B 13/02
See application file for complete search history.

(56) References Cited

U.S. PATENT DOCUMENTS

| | | | |
|---|---|---|---|
| 5,774,420 A | 6/1998 | Heysse et al. | |
| 5,924,499 A * | 7/1999 | Birchak | E21B 47/18 |
| | | | 175/40 |
| 5,930,201 A | 7/1999 | Cray | |
| 6,125,080 A * | 9/2000 | Sonnenschein | B63C 11/26 |
| | | | 367/134 |
| 6,661,738 B1 | 12/2003 | da Silva et al. | |
| 6,998,999 B2 | 2/2006 | Fripp et al. | |
| 7,207,397 B2 * | 4/2007 | Miyamoto | G01V 1/52 |
| | | | 175/50 |
| 7,505,367 B2 * | 3/2009 | Abdi | H04B 11/00 |
| | | | 367/134 |
| 7,623,412 B2 * | 11/2009 | Pabon | G01V 1/50 |
| | | | 166/254.2 |
| 8,102,733 B2 * | 1/2012 | Rapp | G01S 15/74 |
| | | | 367/134 |
| 9,963,965 B2 * | 5/2018 | Saed | H04B 1/005 |
| 10,082,020 B2 * | 9/2018 | Wisniewski | E21B 31/005 |
| 10,491,310 B2 * | 11/2019 | Abdi | H04B 11/00 |

(Continued)

FOREIGN PATENT DOCUMENTS

WO 2011133478 A2 10/2011

OTHER PUBLICATIONS

International Search Report, dated Oct. 25, 2011, for corresponding PCT Application No. PCT/US2011/032936, International Filing Date of Apr. 18, 2011 consisting of 3 Pages.

(Continued)

*Primary Examiner* — Franklin D Balseca
(74) *Attorney, Agent, or Firm* — Gearhart Law LLC

(57) ABSTRACT

The present invention relates to transmitting data using vector sensors and via the vector components of the acoustic field. The data can be received via vector sensors and/or scalar sensors and/or arrays of such sensors.

19 Claims, 15 Drawing Sheets

(56) References Cited

U.S. PATENT DOCUMENTS

| | | | | |
|---|---|---|---|---|
| 2001/0050926 A1* | 12/2001 | Kumar | ............... | H04L 1/08 |
| | | | | 370/529 |
| 2006/0098530 A1* | 5/2006 | Mallison | ............ | E21B 47/18 |
| | | | | 367/81 |
| 2006/0131014 A1* | 6/2006 | Huang | ............... | E21B 47/12 |
| | | | | 166/250.07 |
| 2008/0198695 A1 | 8/2008 | Abdi | | |
| 2009/0205899 A1* | 8/2009 | Geerits | ............... | G01V 1/44 |
| | | | | 181/106 |
| 2013/0253387 A1* | 9/2013 | Bonutti | ............ | A61B 17/24 |
| | | | | 601/46 |

OTHER PUBLICATIONS

Written Opinion, dated Oct. 25, 2011, for corresponding PCT Application No. PCT/US2011/032936, International Filing Date of Apr. 18, 2011 consisting of 3 Pages.

* cited by examiner

Transmit vector sensor    Receive vector sensor

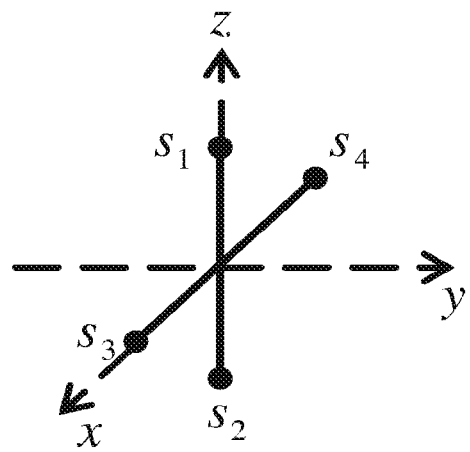 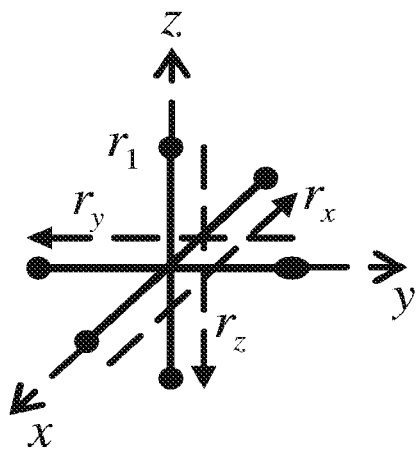
Transmit vector sensor    Receive vector sensor
Fig. 3
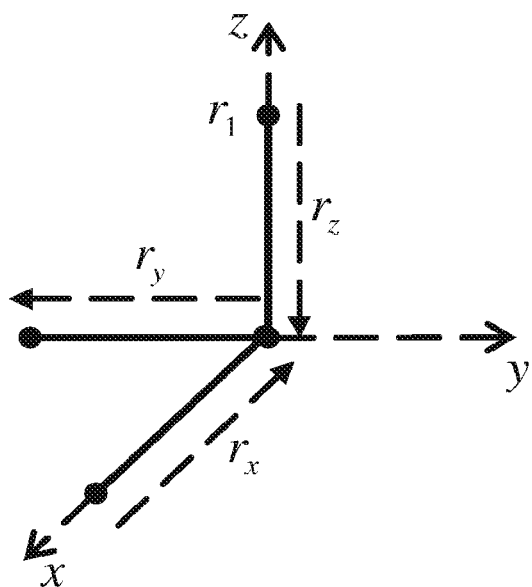 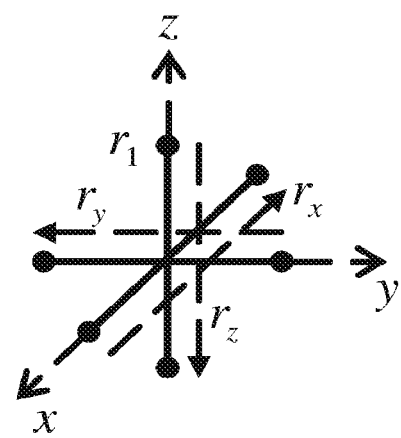
Non − symmetric design    Symmetric design
(a)    (b)
Fig. 4

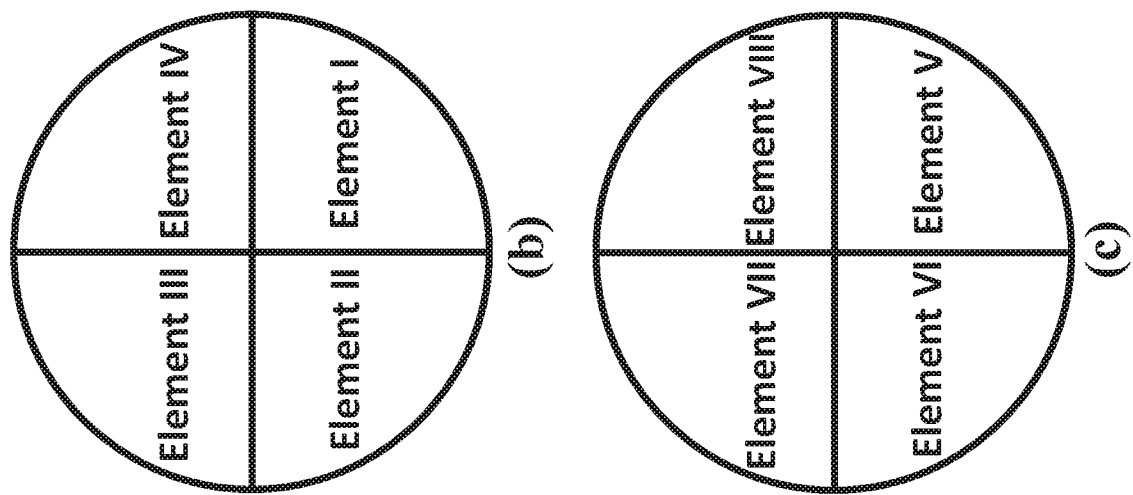
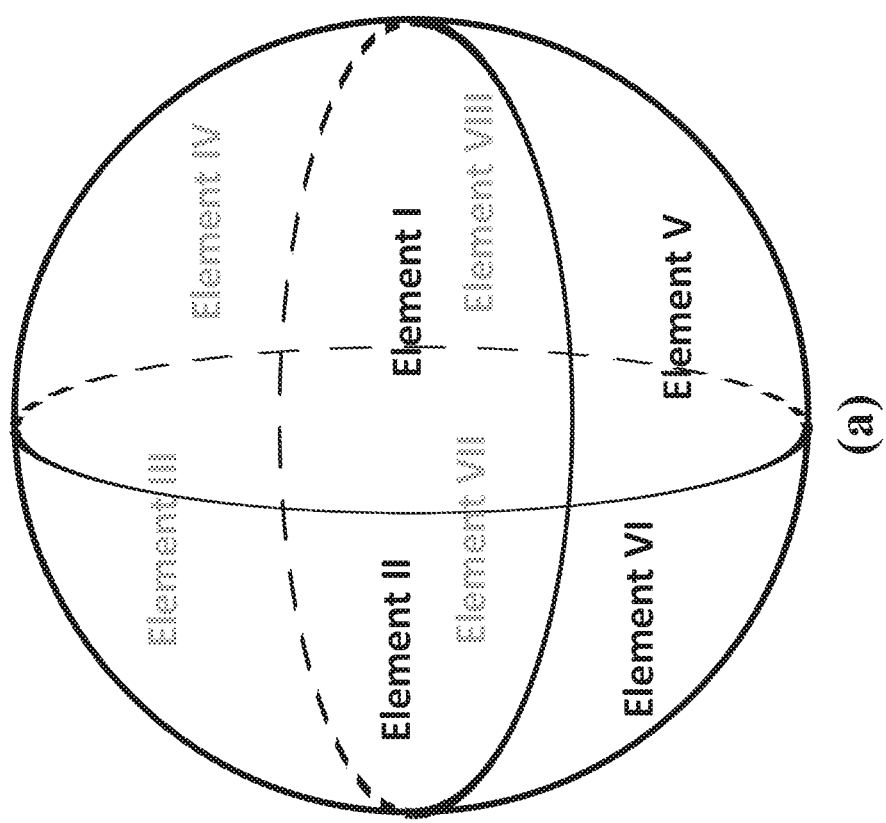
FIG. 17

SYSTEM AND METHOD FOR DATA TRANSMISSION VIA ACOUSTIC CHANNELS

CROSS-REFERENCE TO RELATED APPLICATIONS

This application claims priority to U.S. application Ser. No. 13/641,895 (now U.S. Pat. No. 10,491,310) filed on Oct. 18, 2012, which is a national stage entry of PCT/US11/032936, filed on Apr. 18, 2011, which claims priority to U.S. Provisional Patent Application Ser. No. 61/325,679, filed on Apr. 19, 2010, all of which are herein fully incorporated by reference in its entirety.

GOVERNMENT RIGHTS

The United States government may have certain rights in this invention. A portion of the work described herein was supported in part by the National Science Foundation under Grant No. CCF-0830190. However, the conception of idea and some work were done before the grant.

FIELD OF THE INVENTION

The present invention relates to acoustic communication. More specifically, the invention relates to the use of one or more parameters of the acoustic field for information transmission.

BACKGROUND OF THE INVENTION

There are numerous applications that pose an increasing demand on high speed underwater wireless telemetry and data communication among sensors, autonomous underwater vehicles, moored instruments, and surface ships. Examples include real-time remote monitoring of underwater tools/constructions and environmental factors in offshore oil industry, continuous observation of the ocean phenomena over geographically large areas, fishery industry, etc., as well as many naval and security applications such as harbor monitoring systems, tactical surveillance operations, and so on. However, the data rates that existing systems offer are much lower than what is required for real-time transmission of massive amount of data such as video and telemetry signals, specially over medium and long distances.

Over the past few decades, only the scalar component of the acoustic field, i.e., the acoustic pressure, has been used for data transmission in underwater channels. More specifically, data have been modulated over single or multiple spatially-separated scalar sensors and pressure channels.

SUMMARY OF INVENTION

The invention provides a method, that may include providing a communication system having at least one vector sensor and operating in a medium through which acoustic waves can propagate; transmitting data through the medium using the at least one vector sensor; and receiving the data using at least one scalar sensor or one vector sensor. A variety of scalar and vector sensors and arrays of such sensors can be used. Arrays can have different configurations such as linear, circular, etc.

The invention describes a method for modulating information on scalar and/or vector components of an acoustic field. The acoustic field and waves may travel through any medium. A scalar component of an acoustic field is the pressure. A vector component of an acoustic field includes measurements of particle motion including derivatives of the displacement of particles. This may include a spatial derivative of pressure. The spatial derivative of the pressure may be referred to as a pressure gradient or, in some circumstances, the velocity or particle velocity or acoustic particle velocity. In the following description these terms may be used interchangeably. In addition, vector components used may include spatial derivatives of velocity, velocity gradients, or any higher order derivatives or gradients. Velocity gradients may be referred to as acceleration, particle acceleration, or acoustic particle acceleration, in the following disclosure and are to be considered equivalent.

Systems utilizing parameters of an acoustic field to identify data may use any combination of scalar and vector components. For example, the three orthogonal components of velocity and the scalar pressure component at a single point can be used to transmit or receive information through an acoustic field. Transmitters and receivers, such as vector sensors, can be efficiently manufactured today and enable the use of the unexplored degrees of freedom of the acoustic field. Utilizing vector components of the acoustic field reduces the array size needed to transmit data and/or recover transmitted data, when compared with systems measuring the scalar component alone.

Other aspects, features, advantages, etc. will become apparent to one skilled in the art when the description of the preferred embodiments of the invention herein is taken in conjunction with the accompanying drawings.

DESCRIPTIONS OF THE FIGURES

The teachings of the present invention can be readily understood by considering the following detailed description in conjunction with the accompanying drawings, in which FIG. 1 is an illustration of using the vertical component of an acoustic particle velocity for data transmission, via a one transmit dipole and one receive dipole;

FIG. 2 is an illustration of transmission and reception over x and z velocity channels for one embodiment of the present invention. Each vector sensor includes two dipoles. Received particle velocity signals $_x r$ and $_z r$ are linear functions of the symbols $s_1$ and $s_2$;

FIG. 3 is an illustration for $4_{th}$ order multiplexing gain for one embodiment of the present invention. The pressure $_1 r$ and the velocity components, and $_{x\ y\ z}$ r r r at the receiver are linear functions of the four transmitted symbols $_{1\ 2\ 3\ 4}$ s, s, s, and s;

FIG. 4 shows examples of both non-symmetric and symmetric designs of exemplary embodiments of the present invention;

Figure 7:
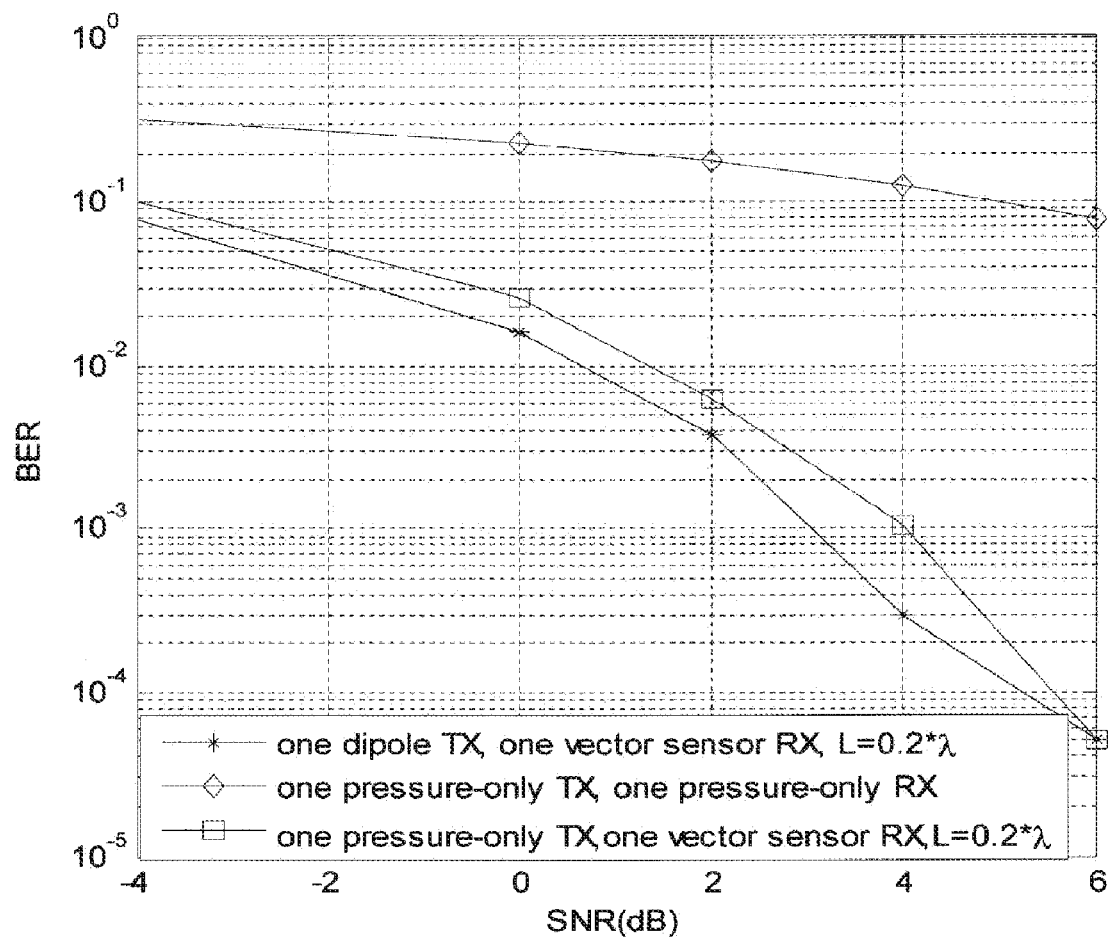
Figure 8:
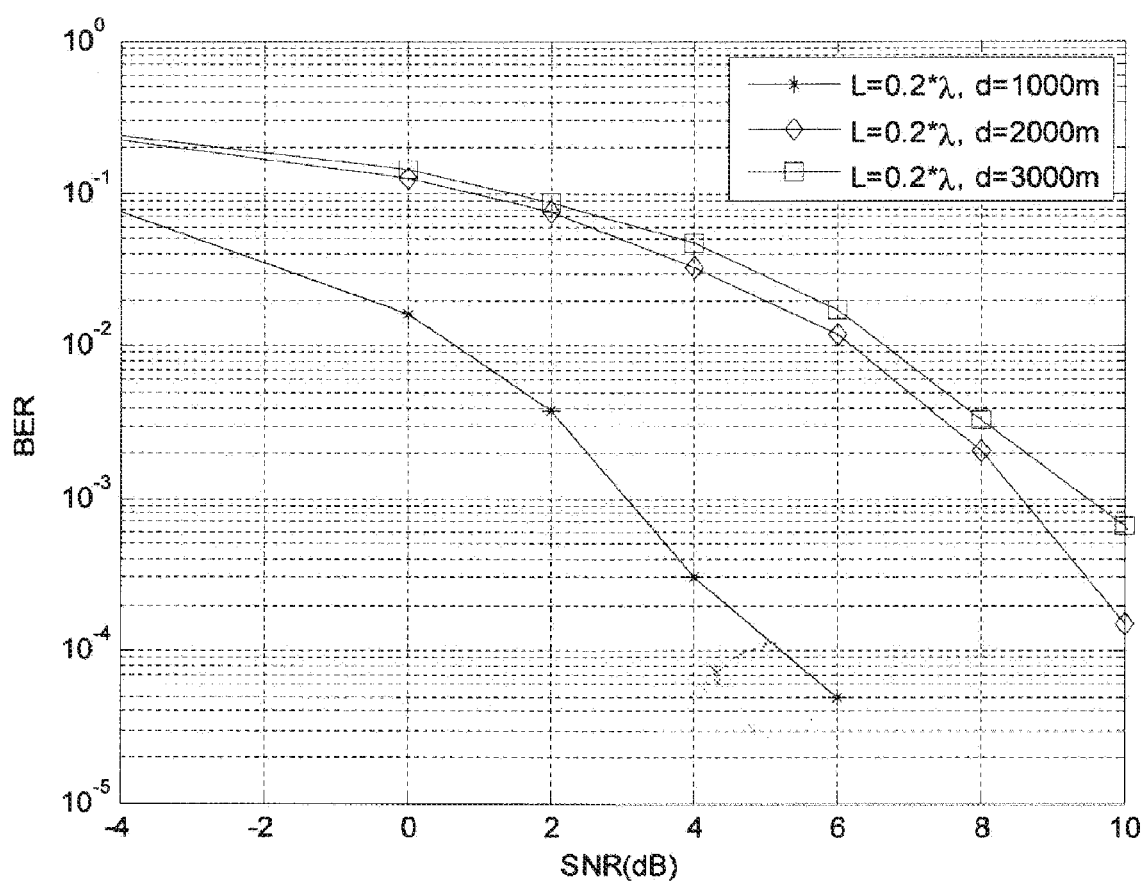

FIG. 7 compares performance of exemplary embodiments by showing bit error rates of: (1) one pressure-only Tx and one pressure-only Rx, (2) one pressure-only Tx and one vector sensor Rx, and (3) one dipole Tx and one vector sensor Rx;

FIG. 8 shows the performance of a proposed exemplary embodiment at 1000 m, 2000 m and 3000 m transmission ranges.

Figure 9:
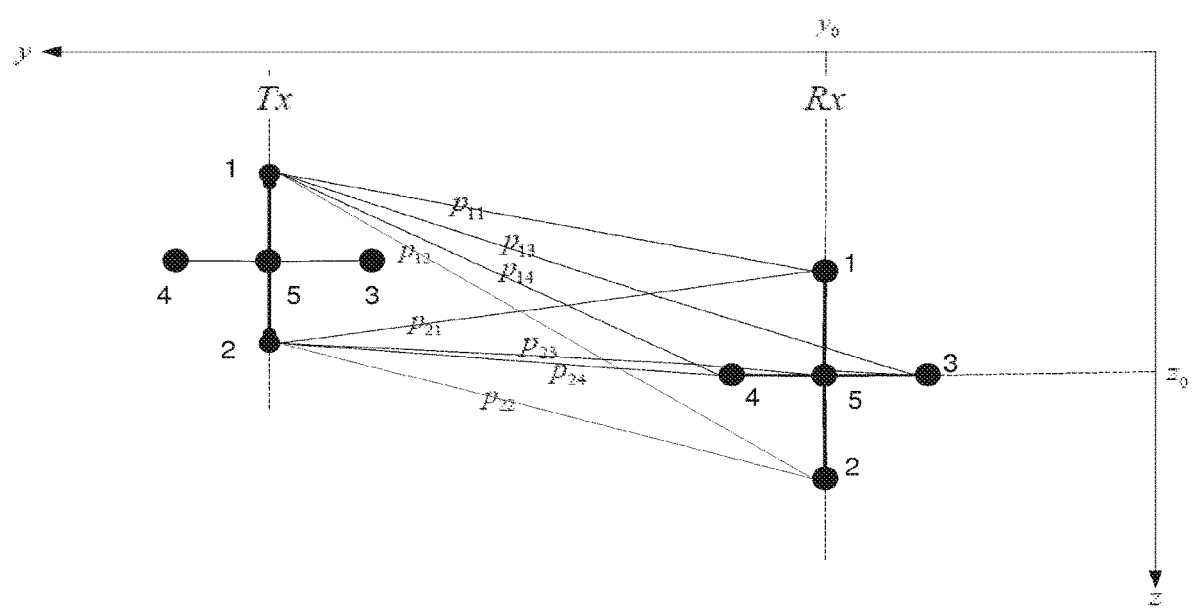
Figure 10:
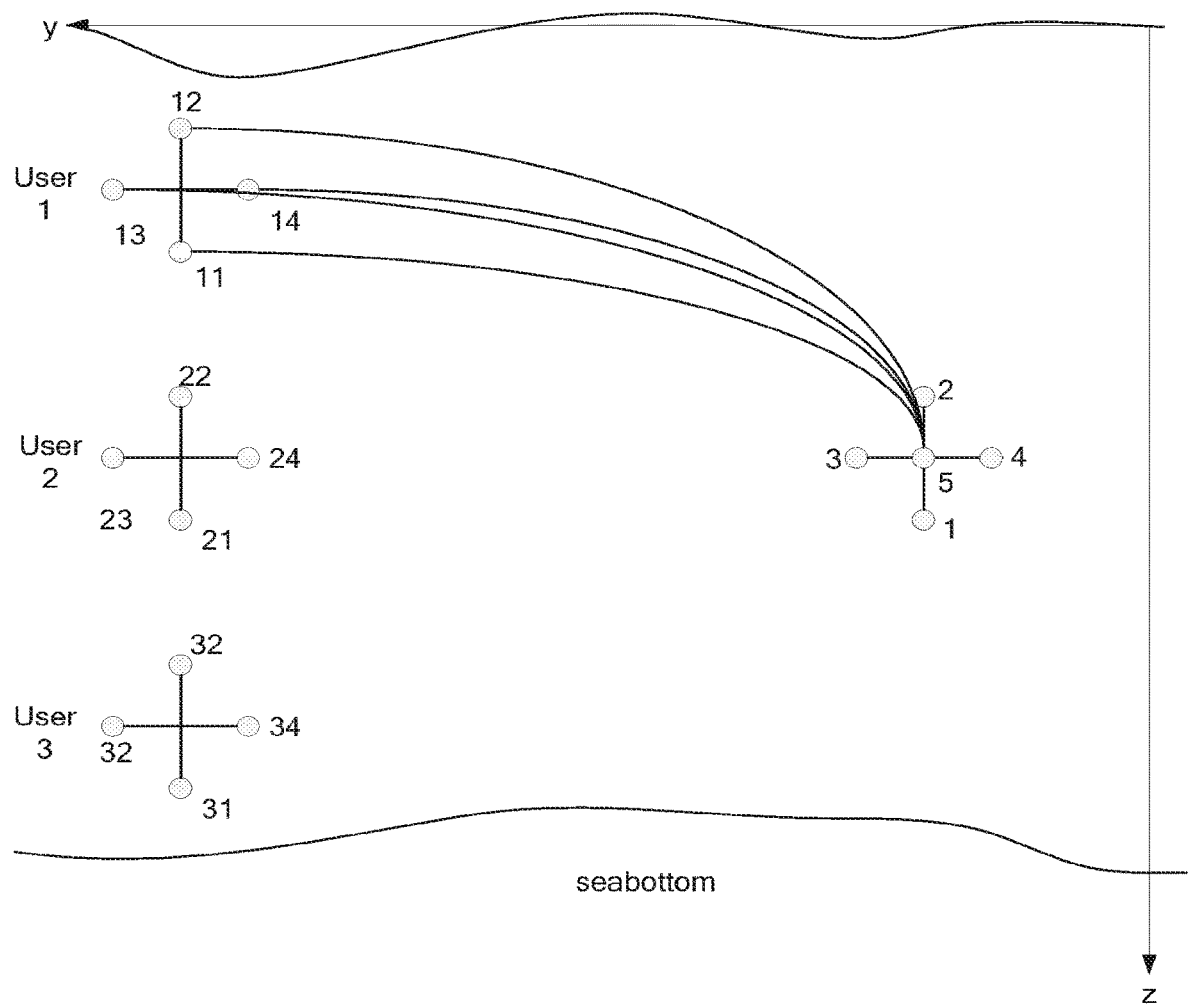
Figure 11:
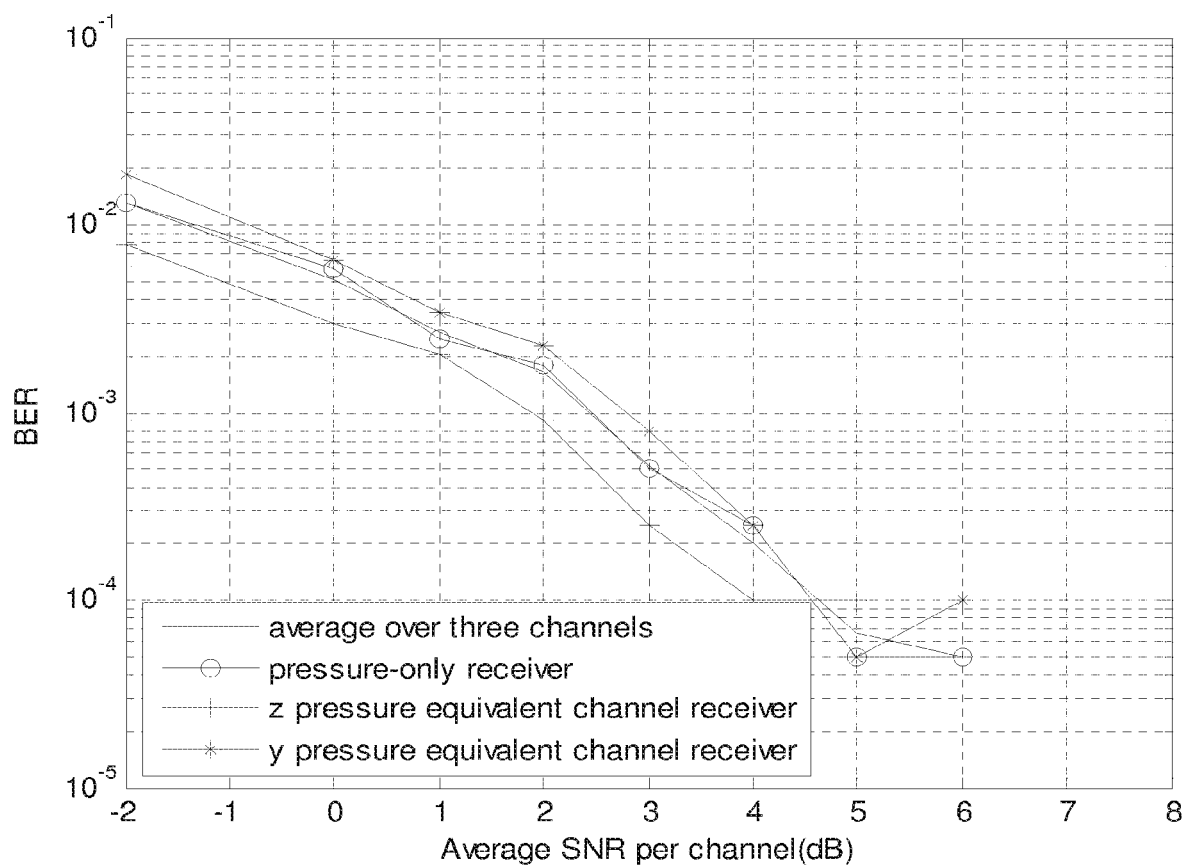
Figure 12:
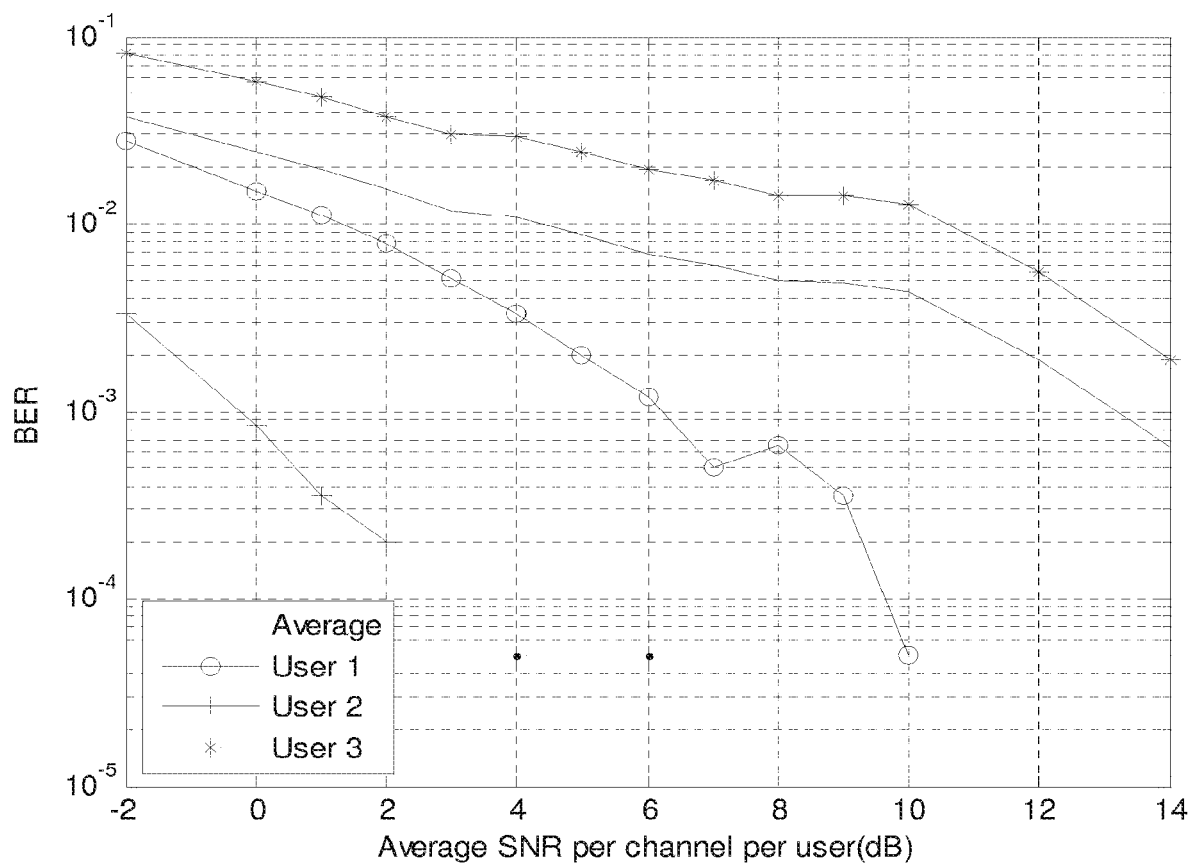

FIG. 9 is an illustration of two transmit dipoles and two receive dipoles for one embodiment of the present invention;

FIG. 10 shows a three-user vector sensor communication system for one embodiment of the present invention, with two transmit dipoles per user and a vector sensor receiver that includes two dipoles and one scalar sensor;

FIG. 11 shows performance of exemplary embodiment of a single-user system of the present invention, modulating Alamouti code over y and z velocity channels and measuring: (1) pressure signal at Rx, (2) z-velocity signal at Rx, (3) y-velocity signal at Rx; and FIG. 12 shows average performance of exemplary embodiment of a multi-user system of the present invention, and also the performance for each individual user.

Figure 13:
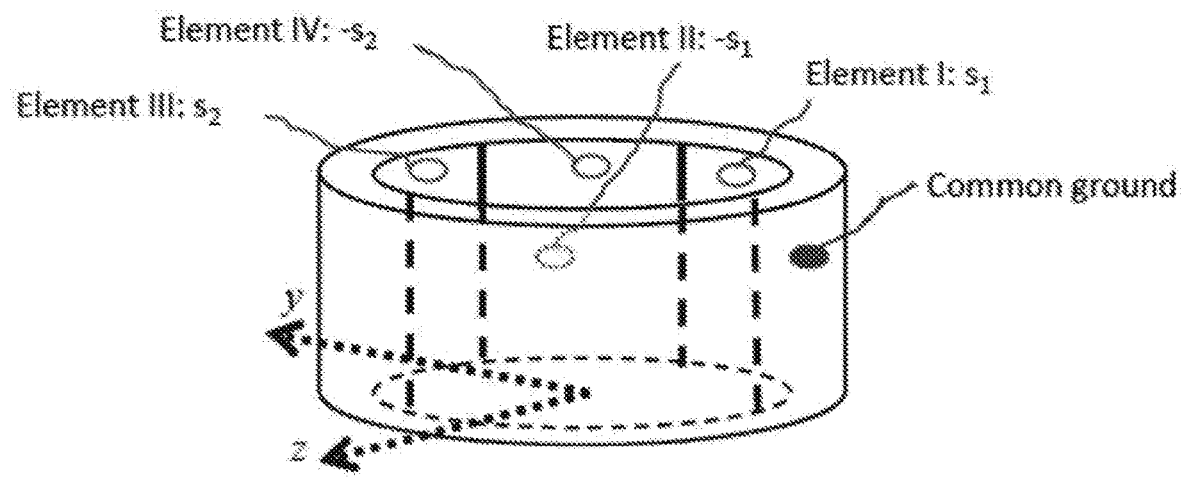

FIG. 13 illustrates a quadrupole transmitter that modulates data ($s_1$ and $s_2$) on z and y velocity components.

Figure 14:
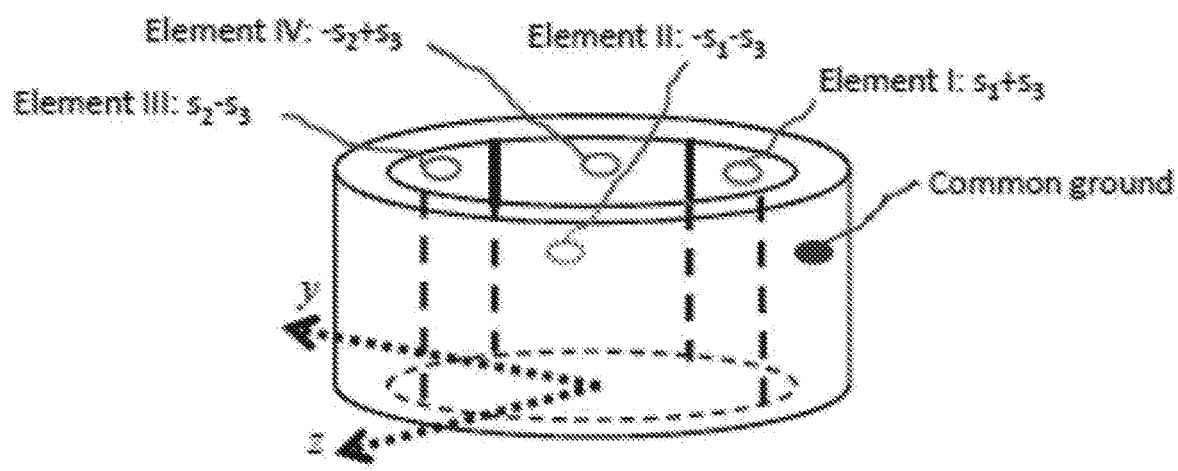

FIG. 14 illustrates a quadrupole transmitter that modulates data ($s_1$, $s_2$, and $s_3$) on z and y velocity components and a combination thereof.

Figure 15:
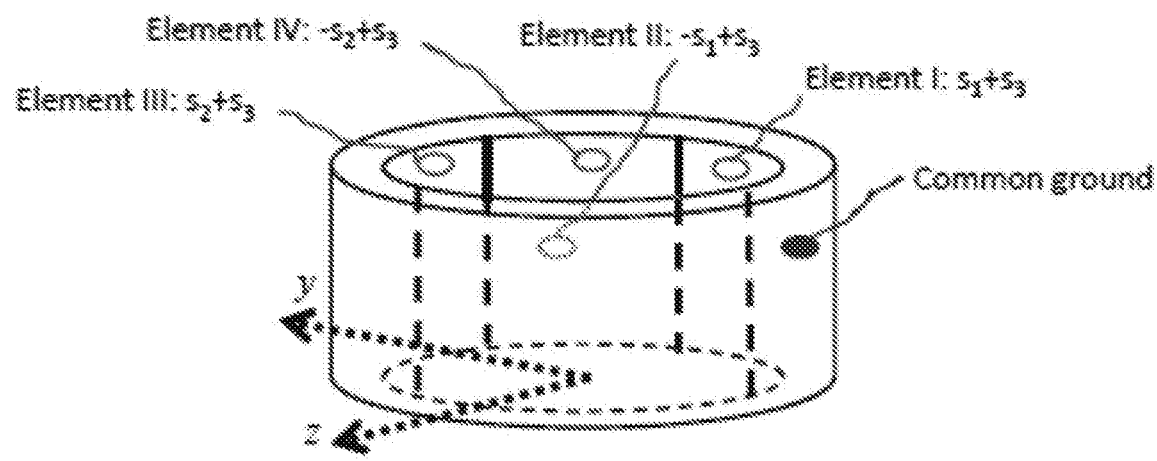

FIG. 15 illustrates a quadrupole transmitter that modulates data ($s_1$ and $s_2$) on z and y velocity components and data ($s_3$) on a scalar pressure component.

Figure 16:
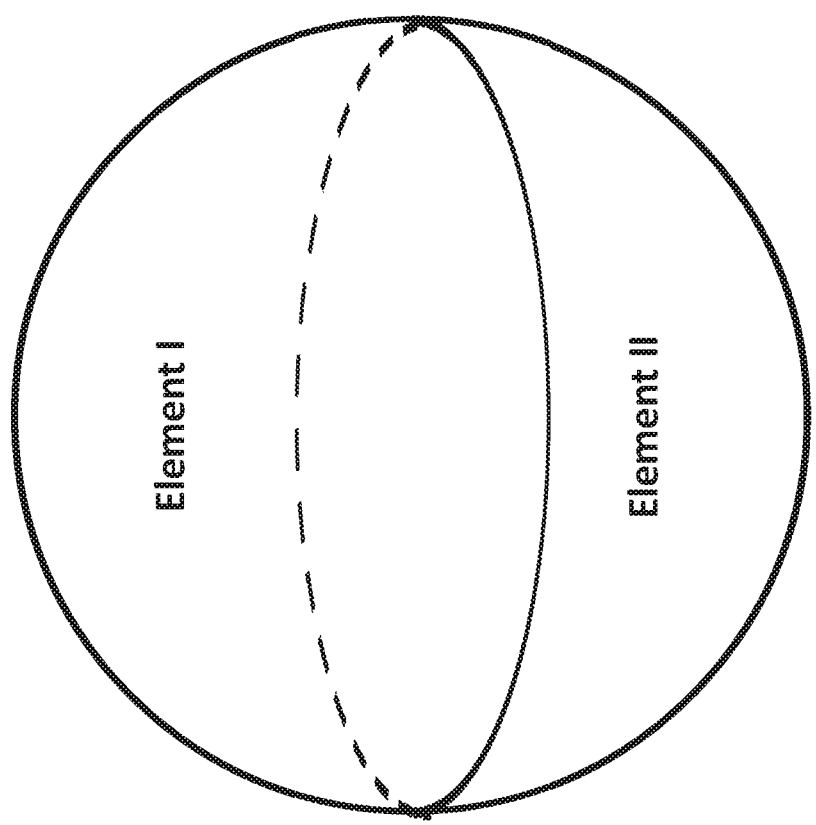

FIG. 16 shows a first exemplary sphere sensor with two elements.

FIGS. 17a-c shows a second exemplary sphere sensor with eight elements from multiple angles or views.

To facilitate understanding, identical reference numerals have been used, where possible, to designate identical elements that are common to the figures.

For the purposes of illustrating the various aspects of the invention, there are shown in the drawings forms that are presently preferred, it being understood, however, that the invention is not limited to the precise arrangements and instrumentalities shown.

DETAILED DESCRIPTION OF INVENTION

The following is a detailed description of the invention provided to aid those skilled in the art in practicing the present invention. Those of ordinary skill in the art may make modifications and variations in the embodiments described herein without departing from the spirit or scope of the present invention. Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. All publications, patent applications, patents, figures and other references mentioned herein are expressly incorporated by reference in their entirety.

The inventor has recently developed the concept of data reception via vector sensors and vector components of the acoustic field such particle velocity channels. The present invention relates to transmitting data using vector sensors and via vector components of the acoustic field, and then receiving the data via vector sensors and/or scalar sensors. Of course data can be transmitted using both vector and scalar sensors, once we learn how to transmit data using a vector sensor. When it comes to single or multiple vector sensor transmitters, new questions arise that are fundamentally different from multiple scalar sensor transmitters. A method and system need to be developed for modulating data, at the transmit side, on multiple co-located vector components of the acoustic field such as velocity channels, acceleration channels, etc. This is entirely different from modulating data on multiple spatially-separated scalar sensors and pressure channels.

The presently disclosed novel system and method include all of the same advantages present in traditional techniques but eliminate associated disadvantages.

Acoustic fields may be used to convey data. A source may be used to encode a package of data in an acoustic field. Sources may include any device, system, or method capable of converting a data package into an acoustic field, such as a transmitter. A receiver may be used to receive the acoustic field. Receivers may include any device, system, or method capable of receiving an acoustic field. Transmitting (receiving) through the acoustic field may include modulating (measuring) one or more parameters of the acoustic field, such as one or more vector components and/or a scalar component. The values of the measured parameters may be used to recover the data package conveyed. Some embodiments utilize measurements of one or more parameters of the acoustic field to recover the conveyed information.

Acoustic fields may be used to convey data in any environment including liquids, gases, solids and/or any combinations thereof. Herein, "fluid" may include liquid and/or gas. For example, acoustic fields may be used to transmit data in underwater channels. Data capable of being conveyed include, but are not limited to, any information, which may be encoded in an acoustic field. For example, a transducer may be used to convert a data package (e.g., electrical signal) into a pressure field, and a receiver may reconvert the pressure signals back into electrical waveforms.

An embodiment includes modulating (measuring) any quantifiable parameter of an acoustic field to transmit data (determine the data conveyed). In an embodiment, one or more vector components of an acoustic field, in addition to the scalar component (i.e., pressure), may be modulated (measured) to transmit data (determine values for the data transmitted). Vector components of an acoustic field include, but are not limited to, the three components of the acoustic particle velocity (i.e., the pressure gradients or the spatial derivatives of the particle displacement), any of the nine components of the spatial derivative of the acoustic particle velocity (i.e., the velocity gradients), and any higher-order gradients of the acoustic field. For example, in a three-dimensional underwater channel, x, y, and z components of the acoustic particle velocity may be modulated for data transmission (measured for data reception), as well as nine components of the velocity gradient.

In an embodiment, one vector component may be modulated (measured) to transmit data (discern values for the conveyed data). Alternately, multiple vector components may be modulated (measured) to transmit data (discern values for the conveyed data). For example, an embodiment may include modulating (measuring) pressure, components of acoustic particle velocity, and components of acoustic particle velocity gradients. In this example, thirteen channels would be available for the conveyance of data. In some embodiments, modulation (measurement) of multiple acoustic parameters may decrease the error probability of data recovery while utilizing a small array at the transmit side (receive side). In other words, use of both scalar and vector components of the acoustic field increases the number of channels available for conveyance of data, and thereby decreases the error probability. In some embodiments, modulation of multiple acoustic parameters may increase data transmission rate and/or throughput, while utilizing a small array at the transmit side. In other words, use of both scalar and vector components of the acoustic field increases the number of channels available for conveyance of data, and thereby increases data transmission rate and/or throughput.

Vector components of an acoustic field may be modulated or measured using devices including, but not limited to, transducers, transmitters, receivers, vector sensors (e.g., inertial sensors, gradient sensors, uniaxial vector sensors, biaxial vector sensors, and/or triaxial vector sensors), multi-axial vector sensors, higher order sensors (e.g., dyadic or tensor sensors), accelerometers (e.g., uniaxial accelerometers), hydrophones, fiber optic-based sensors, or any other devices known in the art or yet to be developed that achieve the same or similar functionality. Modulating or measurements of the scalar components of the acoustic field may be made using devices which include, but are not limited to, pressure sensors, transducers, hydrophones, omni-directional hydrophones, directional hydrophones and/or any other devices known in the art or yet to be developed that achieve the same or similar functionality. Modulating information on or recovering information from the vector components of the acoustic field are not limited to any particular sensor type, any device capable of stimulating or measuring a vector component of the acoustic field suffices.

In an embodiment, a signal may be pre-processed (post-processed) at a transmitter (receiver) using one or multiple processing methods. Processing methods may include any signal processing methods known in the art or yet to be developed that achieve the same or similar functionality, such as equalization algorithms, pre-coding methods, spatial multiplexing, transmit and receive diversity techniques, coding and decoding methods, interference cancellation techniques, temporal and frequency processing, etc. For example, any known or yet to be developed digital and/or analog signal processing method may be used in an embodiment. Although a single-user communication system and method is discussed throughout this application, the inventive principles discussed herein are fully applicable to multi-user communication systems and networks.

Algorithms utilized may include, but are not limited to, different types of single and multi-channels pre-coders and equalizers such as zero-forcing equalizer, a minimum mean square equalizer (herein referred to as MMSE), a decision-feedback equalizer, adaptive equalizers and turbo-equalizers with different types of training algorithms, and/or any processing algorithm used in the art or yet to be developed that achieve the same or similar functionality. In addition to these temporal equalization algorithms, space-time and space-frequency techniques may be used as well.

In some embodiments, one or more receive diversity techniques may be used to combine the measured components including, but not limited to maximal ratio combiner, selection combiner, equal gain combiner, and/or any other techniques known in the art or yet to be developed that achieve the same or similar functionality.

In some embodiments, one or more transmit diversity techniques may be used to add redundancy to the field components including, but not limited to space-time coding, space-frequency coding, space-time-frequency coding, delay diversity, and/or any other techniques known in the art or yet to be developed that achieve the same or similar functionality.

An embodiment includes utilizing a decoding method determined by the code used at the source. The codes used at the source may be source codes (e.g., data compression) channel codes (e.g., temporal codes, space-time codes, space-time-frequency codes), joint source-channel codes, encryption codes, and/or any other methods known in the art or yet to be developed that achieve the same or similar functionality. Further, some embodiments include a processing method capable of performing carrier and/or bit and/or frame synchronization.

Some embodiments include processing methods occurring at the transmitter (receiver). In alternate embodiments, one or more processing devices may be positioned proximate to the transmitting (receiving) device. For example, in an Orthogonal Frequency Division Multiplexing (herein referred to as OFDM) system, inverse fast Fourier transform, herein referred to as IFFT, and fast Fourier transform, herein referred to as FFT blocks are needed at the transmitter and receiver, respectively. In another example, transmitting a spread spectrum signal (e.g., code division multiple access, direct sequence, or frequency hopping) for low-probability of interception communication and/or multi-user communication may create a need for a spreading module at the transmitter and a despreading module at the receiver for certain embodiments.

In some embodiments, a combination of transmitters (receivers) may be used to modulate (measure) the acoustic field. For example, a vector sensor may be used in combination with a hydrophone to modulate (measure) all the acoustic field components. The acoustic field components are used to transmit data (determine values for the conveyed data).

An embodiment may include commercially available vector sensors used as transmitters or receivers. Alternate embodiments may include using a vector sensor in a transceiver to aid in relaying signals.

In one embodiment, an inertial vector sensor is used to modulate (measure) the velocity or acceleration by stimulating (responding to) acoustic particle motion. In alternate embodiments, gradient sensors may be used which utilize a finite-difference approximation to estimate gradients of the acoustic field such as velocity and acceleration.

In some embodiments, a vector sensor may have the capacity to modulate (measure) multiple parameters of the acoustic field. A vector sensor may be designed to modulate (measure) the scalar component of the acoustic field, as well as multiple vector components of the acoustic field, simultaneously.

Transmitters (receivers) may be arranged and/or designed to eliminate a need for arrays of scalar-only transmitting (receiving) devices. For example, use of a system of vector sensors may eliminate a need for large-size pressure-only arrays. In some embodiments, vector sensors may be used as compact multi-channel transmitters and/or receivers, modulating and/or measuring both the scalar and vector components in a single point in space. In contrast are the conventional systems such as pressure-only sensors spatially separated and arranged in large size arrays. Thus, the volume of space required for the transmitters and/or receivers and/or encoding and/or decoding devices may be greatly reduced. The decreased size of transmitters and/or receivers and/or encoding and/or decoding devices make the technology available for a wider variety of applications which were previously prohibited. Some of examples of this include, but are not limited to, small autonomous and/or unmanned underwater vehicles, divers communicating with each other and a submarine, etc.

In some embodiments, devices used to modulate and/or measure acoustic wave parameters may be neutrally buoyant in the fluid through which the acoustic field is traveling. For example, vector sensors may be neutrally buoyant in a fluid such as water.

An acoustic field communication system may include single input single output systems (herein referred to as SISOs), single input multiple output systems (herein referred to as SIMOs), multiple input single output systems (herein referred to as MISOs), and multiple input multiple output systems (herein referred to as MIMOs).

Conveyed data may include voice, video, text, numbers, characters, images, control and command signals, telemetry signals, and/or other outputs from devices used to convert physical quantities into data communication symbols.

Signals transmitted via the acoustic field communication system may be modulated on a carrier. In some embodiments, modulation may include, but is not limited to, angular modulation, phase modulation (herein referred to as PM), frequency modulation (herein referred to as FM), amplitude modulation (herein referred to as AM), single-sideband modulation (herein referred to as SSB), single-sideband suppressed carrier modulation (herein referred to as SSB-SC), vestigial-sideband modulation (herein referred to as VSB), sigma-delta modulation, phase-shift keying (herein referred to as PSK), frequency-shift keying (herein referred to as FSK), amplitude frequency-shift keying (herein referred to as AFSK), minimum-shift keying (herein referred to as MSK), Gaussian minimum-shift keying (herein referred to as GMSK), very minimum-shift keying (herein referred to as VMSK), binary phase-shift keying (herein referred to as BPSK), quadrature phase-shift keying (herein referred to as QPSK), offset or staggered phase-shift keying (herein referred to as SQPSK), π/4 quadrature phase-shift keying (herein referred to as π/4 QPSK), differential phase-shift keying (herein referred to as DPSK), amplitude-shift keying (herein referred to as ASK), on-off keying (herein referred to as OOK), quadrature amplitude modulation (herein referred to as QAM), continuous phase modulation (herein referred to as CPM), trellis coded modulation (herein referred to as TCM), polar modulation, pulse-code modulation, pulse-width modulation, pulse-amplitude modulation, pulse-position modulation, pulse-density modulation, space-time modulations (e.g., unitary, rotated constellation), multi-carrier methods such as OFDM, collaborative methods, and any other modulation systems known in the art or yet to be developed that achieve the same or similar functionality.

An embodiment of the system increases the number of channels for data communication by utilizing vector components of an underwater acoustic field. Further, the system optimizes the use of the bandwidth available. For example, bandwidth available for use in underwater environments may be a limiting factor. In an embodiment, a volume of space required for an acoustic field communication system may be reduced by utilizing transmitters and/or receivers using vector components of the acoustic field.

Use of transmitters capable of modulating vector components of an acoustic field may, in some embodiments, increase a rate of data transfer and increase the reliability of the communication system.

Use of receivers capable of measuring vector components of an acoustic field may, in some embodiments, increase the reliability of the communication system.

Basic Definitions

Figure 1:
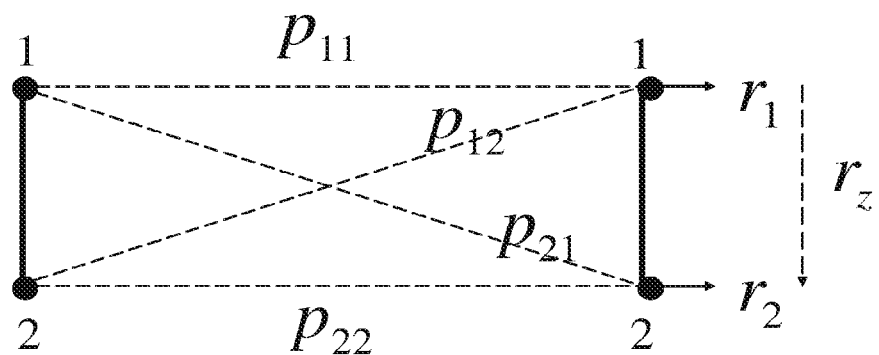

Here we consider one dipole at the transmitter and one at the receiver, as shown in FIG. 1, to explain the principles of communication via the vector components of the field. Each dipole consists of two closely-spaced pressure sensors and resembles a gradient-type vector sensor. A vertical dipole is symbolically used here to represent a device (vector sensor) which has the capability to measure or stimulate the pressure and the z-component of the velocity. Depending on the application, cost, size, dynamic range, noise level, etc., one may use combinations of dipoles and/or tripoles, etc., and/or other types of vector sensors and the idea is not limited to a particular sensor type. The complex baseband channel coefficient between any pair is shown in FIG. 1 by $p_{ik}$, i, k=1, 2, which is assumed to be time-invariant, to simplify the notation. Extension to wideband (frequency-selective) and time-varying (time-selective) channels is straightforward, and will become apparent to one skilled in the art when the description of the preferred embodiments of the invention herein is taken in conjunction with the accompanying drawings. When the data symbol s, for example, BPSK (all other digital and analog modulation types can be used.), is applied to the element #1 at the transmitter, then the received pressures at elements #1 and #2 of the receiver are $r_1=p_{11}s$ and $r_2=p_{21}s$, respectively. With regards to data reception, via the vertical spatial gradient of pressure at the receiver, due to the first transmitter, i.e., $r_z=v_z^{Tx1}$ s. Note that $v_z^{Tx1}$=pressure gradient$\propto p_{11}-p_{21}$ is the z-component of velocity at the receiver, due to the first transmitter only. This is because velocity in a certain direction is proportional to the spatial pressure gradient in that direction. All the channel coefficients $p_{ik}$'s and $v_z^{Tx1}$ could be random variables or processes, e.g., complex Gaussian, because of the unknown complex inhomogeneities of the channel, multiple scatterings/propagation paths, and the rough sea floor. Multiple propagation paths are not shown in FIG. 1, to make it easy to read.

Examples

The following examples provide those of ordinary skill in the art with a complete disclosure and description of how to make and use the present invention, and are not intended to limit the scope of what the inventor regards as his invention nor are they intended to represent that the experiments below are all or the only experiments performed.

Data Transmission Via a Single Velocity Channel

In one exemplary embodiment of the present invention, we apply the data symbol s/2 to element #1 and −s/2 to element #2 at the transmitter (Dividing by 2 is just for normalization purposes and simplification of the notation. It is not necessary to do this and any other normalization known in the art or yet to be developed achieves the same or similar functionality). The vertical spatial gradient at the transmitter of said embodiment is s/2−(−s/2)=s, which means the symbol s is modulated on the z-velocity at the transmitter (This can be similarly done on a horizontal or oblique dipole, in a two-dimensional or three-dimensional propagation environment). The received pressures for said embodiment at elements #1 and #2 of the receiver are $r_1=p_{11}(s/2)+p_{12}(-s/2)$ and $r_2=p_{21}(s/2)+p_{22}(-s/2)$, respectively, according to FIG. 1. The vertical spatial gradient at the receiver is for said embodiment given by $r_z=(v_z^{Tx1}-v_z^{Tx2})$ s, where $v_z^{Tx2} \propto p_{12}-p_{22}$ is the z-component of the velocity at the receiver, due to the second transmitter only (The term $v_z^{Tx1}-v_z^{Tx2}$ is the spatial gradient of particle velocity, so may be considered as particle acceleration). Note that $v_z^{Tx1}$ and $v_z^{Tx2}$ could be random variables or processes for said exemplary embodiment. The expression $r_z=(v_z^{Tx1}-v_z^{Tx2})s$ in said embodiment shows how one can transmit and receive data symbols via the z component of acoustic velocity.

Extension to the case where $e^{j\alpha_1}$ s and $-e^{j\alpha_2}$ s are applied to element #1 and element #2 at the transmitter, respectively, can be done by one skilled in the art. For example, one can set $\alpha_1=0$ and choose $\alpha_2$ such that symbol error probability is minimized. Other constellation rotations in conjunction with space-time codes may also be used.

Data Transmission Via Two Velocity Channels

Figure 2:
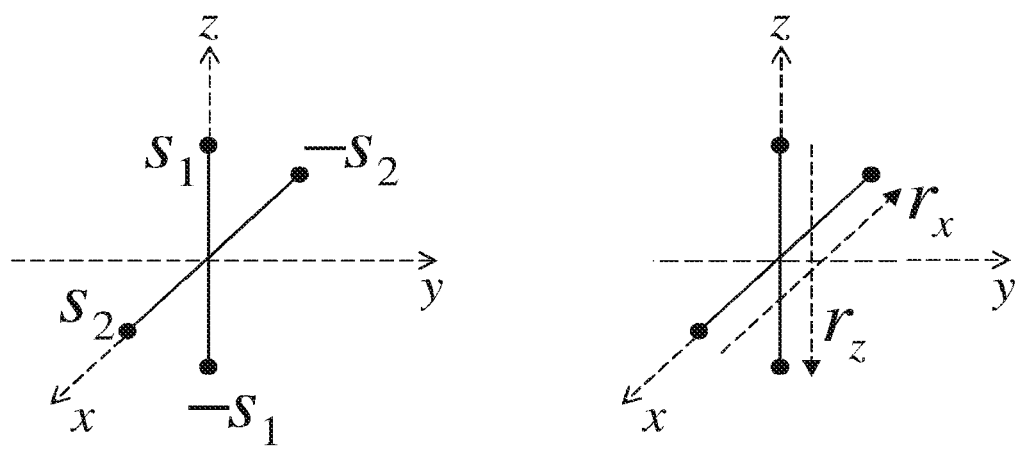

The example described above demonstrates how one can transmit and receive data symbols through the z component of acoustic particle velocity. In a further exemplary embodiment of the present invention (see FIG. 2) we extend the idea to two velocity channels. The key idea for this further exemplary embodiment of the present invention is the application of a symbol and its negative to each dipole. This novel signaling is inspired by the physical acoustics fact that particle velocity is the spatial gradient of pressure. As outlined above, it can be shown that the x and z received particle velocity signals $r_x$ and $r_z$ are linear functions of the two transmitted symbols $s_1$ and $s_2$. This means doubling the transmission rate, as $s_1$ and $s_2$ are transmitted simultaneously. Notice that these two symbols are simultaneously transmitted via a compact vector sensor, much smaller than a pressure-only transmit array with two spatially-separated elements. As illustrated by this exemplary embodiment, using another dipole in the y direction, a third symbol can be transmitted. This idea is extendable to co-located particle acceleration channels as well. In certain exemplary embodiments of the present invention data transmission through acoustic particle velocity channels is proposed. Along the same line, one can think of data transmission via acoustic particle acceleration channels. For certain exemplary embodiments of the present invention, particle acceleration can be measured by dyadic or tensor sensors, together with particle velocity and pressure, all at a single point in space. This means even a larger number of co-located channels, because particle acceleration has nine components, whereas particle velocity has three components. Based on the proposed particle velocity transmission schemes of exemplary embodiments of the present invention, one can think of developing proper coding and interference cancellation techniques, to achieve multiplexing, diversity and coding gains. For example, an Alamouti type code can be applied to FIG. 2, to obtain transmit diversity. This is presented at the beginning of multiuser section of this document.

One can use more complex architectures. For example, by using more vector components of the acoustic field, such as x, y and z velocity components, one can get a high multiplexing gain (transmission rate). For example, the exemplary embodiment of the present invention illustrated in FIG. 3 offers a fourth-order multiplexing gain (four times faster communication). Although exemplary embodiments of the present invention utilizing symmetric arrangement of dipoles are considered here, as shown in FIG. 4b, one can have a non-symmetric arrangement (FIG. 4a). Symmetric design of said embodiments has two more pressure sensors, yet may have some advantages due to its symmetric shape, e.g., simpler packaging or more robustness to element mismatches.

If we have at least one vector sensor at the transmit side with x, y and z channels, this means we have at least three channels to modulate the data on. If there is a scalar sensor packed in the vector sensor, then we have four channels for modulating the data over. If the vector sensor measures acceleration channels, we obtain nine additional channels for data modulation. Higher order gradients are possible. It is also possible to have arrays of spatially separated vector sensors for data transmission.

When there are several channels for data transmission, one may use all possible space-time or space-time-frequency codes, which may offer, including but not limited to, coding gain, and/or diversity gain and/or multiplexing gain, and/or may achieve some optimal or non-optimal tradeoffs such as, but not limited to, diversity-multiplexing tradeoff, etc. Examples of such methods are, but not limited to, tilted-QAM code that achieves the optimal diversity-multiplexing tradeoff curve for multiple antenna channels, Golden code, $B_{2,\varphi}$ code which is a full diversity and full rate space-time code (a special case of Threaded Algebraic Space-Time (TAST) code), $C_r$ code which is less complex than Gold code but provides a higher coding gain than titled-QAM code as well as the TAST code, unitary matrix design, FRFD space-time code which provides a higher coding gain than Gold code and titled-QAM code, etc.

Proof and Further Examples

Figure 5:
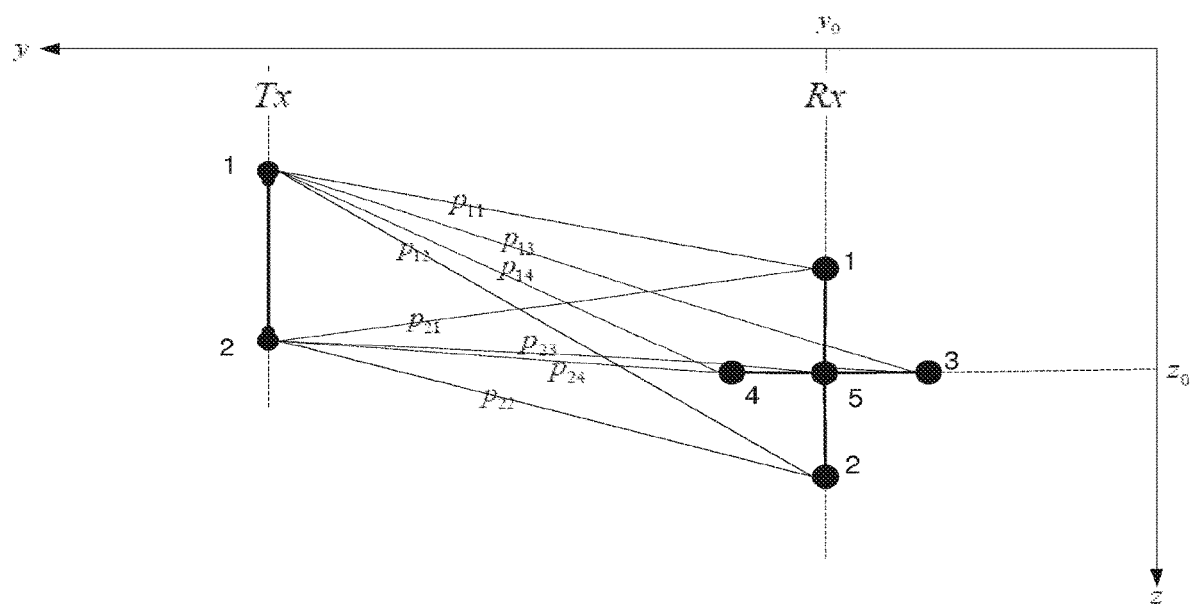
FIG. 5 is an illustration of one transmit dipole and two receive dipoles for one embodiment of the present invention.

Again, in respect to certain exemplary embodiments, a dipole is composed of two closely-placed pressure sensors, so the spatial gradient between the two pressure sensors can be viewed as the signal which is modulated on the dipole in the direction along the axis of the dipole. With respect to the present invention, a vector sensor measures three components in a two-dimensional propagation environment: pressure, y and z components of the particle velocity (in a three-dimensional propagation environment the x component exists as well). According to the physical characteristics of the dipole for one exemplary embodiment of the present invention, the y and z components of the particle velocity can be modeled by two dipoles in y and z directions, respectively, at the receiver, as shown in FIG. 5. Assume the dipole at the transmitter for said embodiment is in z direction as shown in FIG. 5 (we may have more dipoles, tripoles, quadropoles, etc., at the transmitter, in the same and/or different directions, at the same y-z coordinate or different coordinates). At the transmitter, the two pressure sensors in dipole for one embodiment of the present invention are labeled as 1 and 2. At the receiver of said embodiment, the four pressure sensors in y and z components are labeled as 1, 2, 3 and 4 (we may have more dipoles, tripoles, quadropoles, etc., at the receiver, in the same and/or different directions, at the same y-z coordinate or different coordinates). So, for an exemplary embodiment there are eight different channel responses, as shown in FIG. 5. The symbol $p_{ij}$ stands for the response from sensor i at the transmitter to sensor j at the receiver, i=1, 2, j=1, 2, 3, 4.

According to the linearized equation for time-harmonic waves, the z and y components of the velocity at the frequency $f_0$ for a given point $(y_0, z_0)$ at receiver from sensor 1 and 2 of one exemplary embodiment of the present invention is given as $$v_z^{TX1} = -(j\rho_0\omega_0)^{-1}(p_{12}-p_{11})/L,$$

$$v_z^{TX2} = -(j\rho_0\omega_0)^{-1}(p_{22}-p_{21})/L,$$

$$v_y^{TX1} = -(j\rho_0\omega_0)^{-1}(p_{14}-p_{13})/L,$$

$$v_y^{TX2} = -(j\rho_0\omega_0)^{-1}(p_{24}-p_{23})/L, \quad (1)$$

where $\rho_0$ is the density of the fluid, $j^2=1$, $\omega_0=2\pi f_0$ and L is the distance between the two pressure sensors in the dipole of said embodiment, and may be small to approximate a gradient. Note that although in (1) and some other equations in this disclosure, the length of all the dipoles in FIG. 5 are considered to be the same to simplify the notation, different dipoles may have different lengths and this provides the same or similar functionality. Eq. (1) states the velocity in a certain direction is proportional to the spatial pressure gradient in that direction.

Suppose we modulate $s/\sqrt{2}$ and $-s/\sqrt{2}$ at sensors 1 and 2, respectively, for said embodiment (If $\|s\|=1$, then the signal power at the transmitter is 1 because of this normalization. It is not necessary to do this and any other normalization known in the art or yet to be developed achieves the same or similar functionality). Then on the z velocity component a symbol $\sqrt{2}s$ is modulated. Ignoring the effect of noise for a moment, we define the received signal of each pressure sensor of one exemplary embodiment at the receiver as $$r_1(p_{11}-p_{21}) \oplus (s/\sqrt{2}), r_2 = (p_{12}-p_{22}) \oplus (s/\sqrt{2})$$

$$r_3(p_{13}-p_{23}) \oplus (s/\sqrt{2}), r_4 = (p_{14}-p_{24}) \oplus (s/\sqrt{2}) \quad (2)$$

where $\oplus$ means convolution. In the same way, we define the y and z components of the particle velocity of the vector sensor at the receiver of one exemplary embodiment, for a given point $(y_0, z_0)$ shown in FIG. 5 as $$\eta_z = -(j\rho_0\omega_0)^{-1}(r_2-r_1)/L,$$

$$\eta_y = -(j\rho_0\omega_0)^{-1}(r_4-r_3)/L. \quad (3)$$

By combining Eqs. (1)-(3), the y and z components can be rewritten as $$\eta_z = (v_z^{TX1}-v_z^{TX2}) \oplus (s/\sqrt{2}), \eta_y = (v_y^{TX1}-v_y^{TX2}) \oplus (s/\sqrt{2}). \quad (4)$$

Suppose, for one embodiment of the present invention, we put another sensor (labeled as 5 in FIG. 5) at the point $(y_0, z_0)$, to measure the pressure. If we represent the channel response from sensors 1 and 2 at transmitter to sensor 5 as $p_{15}$ and $p_{25}$, respectively, then for said embodiment the received signal at sensor 5 is $$r = (p_{15}-p_{25}) \oplus (s/\sqrt{2}). \quad (5)$$

Figure 6:
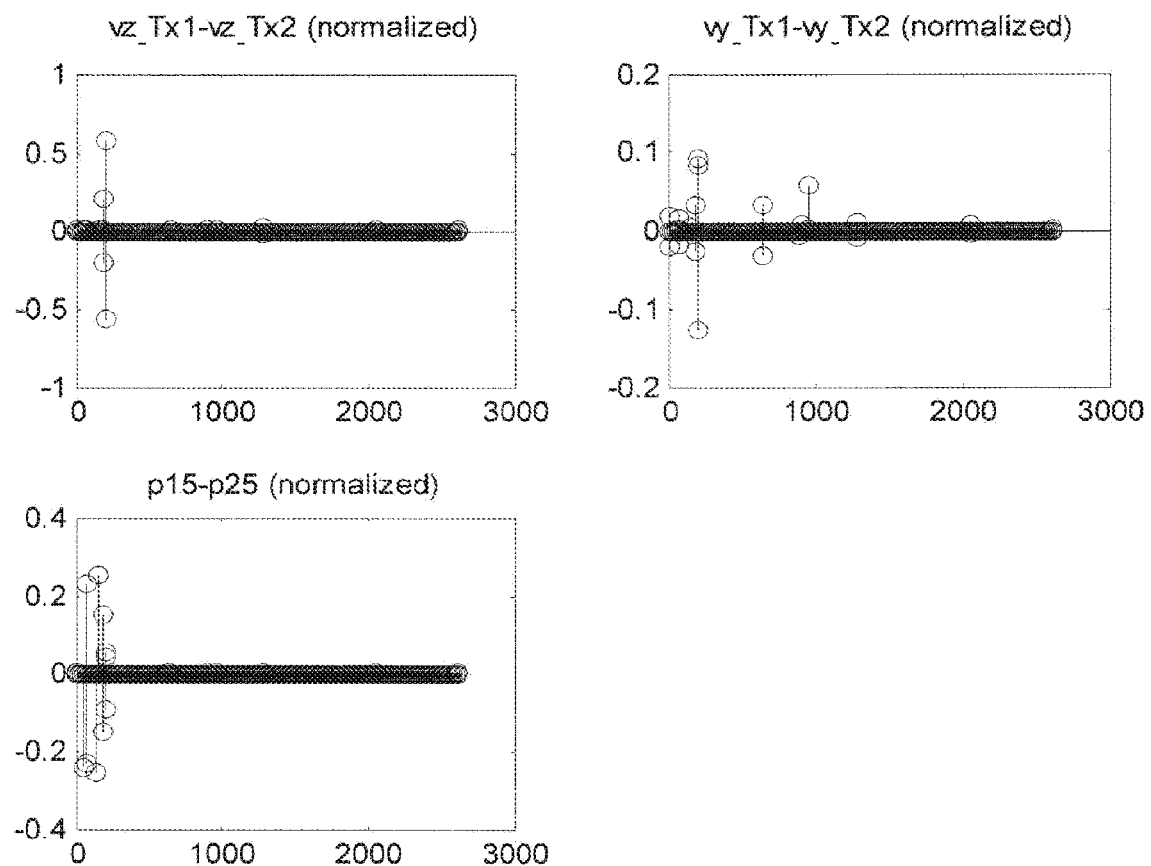
FIG. 6 shows coarse silt bottom type impulse responses for one embodiment of the present invention (a), and very fine sand bottom type impulse responses for one embodiment of the present invention (b)
Figure 6:
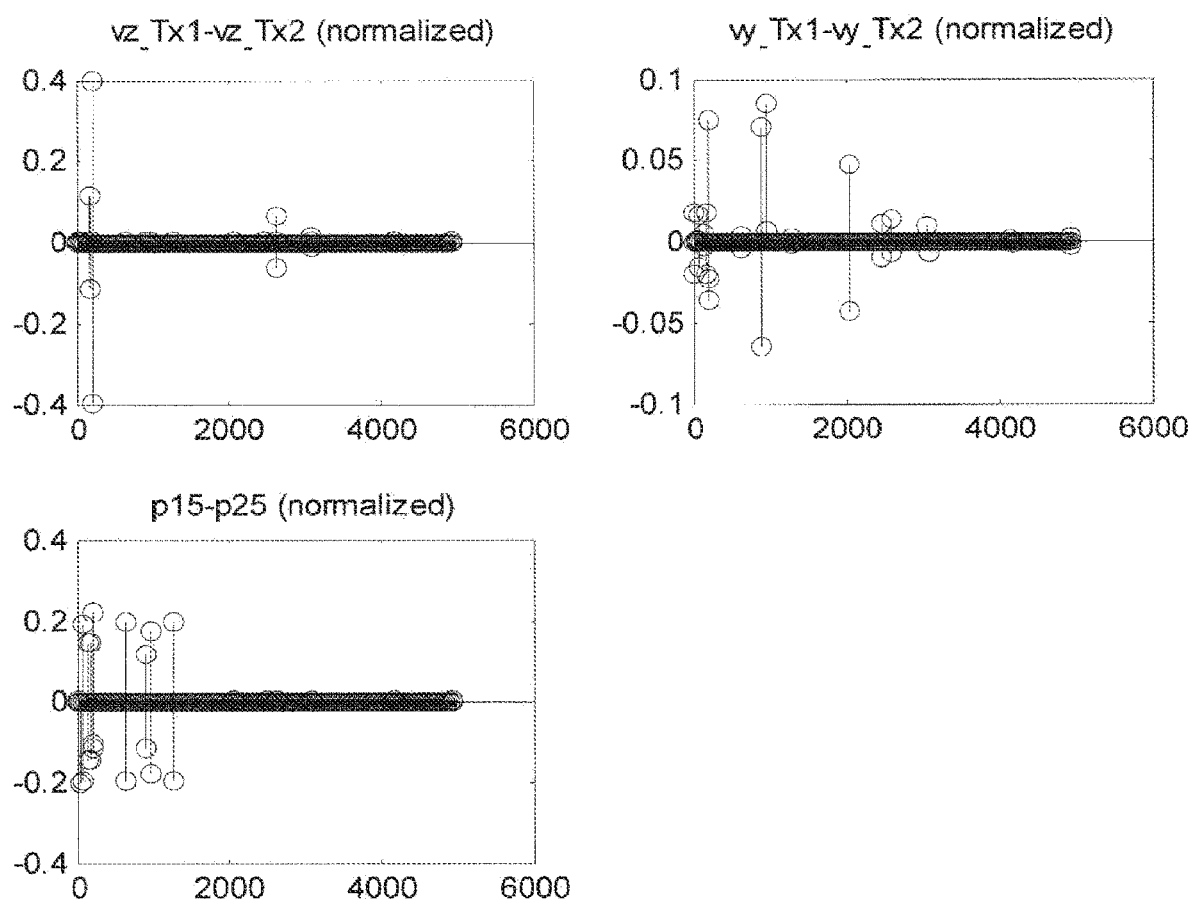

In FIG. 6 we have presented simulated impulse responses of the channels in (4) and (5) for one embodiment of the present invention for two different bottom types: coarse silt and very fine sand. In simulation of said embodiment, the channel response is generated by Bellhop, $L=0.2\lambda$, the transmission range is 1000 m and the depths of the transmitter and the receiver are 25 m and 63 m, respectively. One of ordinary skill in the art would appreciate more simulated channel impulse responses and frequency transfer functions are possible.

For said embodiment and coarse silt bottom, the correlation between $(v_z^{TX1}-v_z^{TX2})$ and $(v_y^{TX1}-v_y^{TX2})$ is 0.1228, for $(p_{15}-p_{25})$ and $(v_y^{TX1}-v_y^{TX2})$ is 0.5124, and for $(p_{15}-p_{25})$ and $(v_z^{TX1}-v_z^{TX2})$ is 0.2874 (the three channel impulse responses are shown FIG. 6a). For said embodiment and very fine sand bottom, the correlation between $(v_z^{TX1}-v_z^{TX2})$ and $(v_y^{TX1}-v_y^{TX2})$ is 0.1657, for $(p_{15}-p_{25})$ and $(v_y^{TX1}-v_y^{TX2})$ is 0.5742, and for $(p_{15}-p_{25})$ and $(v_z^{TX1}-v_z^{TX2})$ is 0.2740 (the three channel impulse responses are shown FIG. 6b).

By multiplying Eq. (1) with $-\rho_0 c$, the negative of the acoustic impedance, we obtain the pressure-equivalent velocity channels for one exemplary embodiment of the present invention (this multiplication is essentially a normalization and/or scaling, and any other normalization and/or scaling known in the art or yet to be developed achieves the same or similar functionality)

$$p_z^{TX1} = (jk)^{-1}(p_{12}-p_{11})/L,$$

$$p_z^{TX2} = (jk)^{-1}(p_{22}-p_{21})/L,$$

$$p_y^{TX1} = (jk)^{-1}(p_{14}-p_{13})/L,$$

$$p_y^{TX2} = (jk)^{-1}(p_{24}-p_{23})/L, \quad (6)$$

where $k = 2\pi/\lambda = \omega_0/c$ is the wave number. Similarly, we define the z and y components of the pressure-equivalent received velocity signals of one embodiment of the present invention as $$r_z = -\rho_0 c \eta_z, r_y = -\rho_0 c \eta_y. \quad (7)$$

By combining Eqs. (4), (6) and (7) we obtain $$r_z = (p_z^{TX1}-p_z^{TX2}) \oplus (s/\sqrt{2}), r_y = (p_y^{TX1}-p_y^{TX2}) \oplus (s/\sqrt{2}). \quad (8)$$

According to the definition of pressure-equivalent ambient noise, including the pressure-equivalent ambient noise in the receiver extends Eq. (8) to $$r_y = (p_y^{TX1}-p_y^{TX2}) \oplus (s/\sqrt{2})+n_y, r_z = (p_z^{TX1}-p_z^{TX2}) \oplus (s/\sqrt{2})+n_z. \quad (9)$$

Here by definition we have $n_z = -(jk)^{-1}(n_2-n_1)/L$, $n_y = -(jk)^{-1}(n_4-n_3)/L$, where $n_y$ and $n_z$ are the pressure-equivalent ambient noise components in the y and z pressure-equivalent velocity channels presented in Eq. (9). Moreover, adding the pressure ambient noise to Eq. (5) results in $$r = (p_{15}-p_{25}) \oplus (s/\sqrt{2})+n. \quad (10)$$

The noise models in (9) and (10) are put forth so as to provide those of ordinary skill in the art with a complete disclosure and description of how to make and use the present invention, and is not intended to limit the scope of what the inventor regards as his invention. This invention is applicable to other types of noise and/or interference and/or reverberation, such as but not limited to Gaussian, non-Gaussian, additive, multiplicative, stationary, non-stationary, cyclo-stationary, white, colored, narrowband, wideband, ambient, non-ambient, man-made, structure-borne, flow noise, surface-generated noise, acoustic noise, non-acoustic noise, etc., pressure noise, velocity noise, acceleration noise, higher-order noises, etc.

Simulation Results

In simulations we have used the zero-forcing equalization method (other methods of equalizations may be used). The channel impulse responses are generated using Bellhop (other simulation methods and programs may be used such as, but not limited to, Monterey-Miami Parabolic Equation (MMPE), etc.). At 12 kHz, 2400 bits/s BPSK symbols were simulated with no coding (as said previously, different types of codes such as channels codes, source codes, encryption codes, trellis-coded modulation, etc., may be used). Two hundred symbols are transmitted each time and the system has been simulated 100 times. The transmission range is 1000 m. The depth of the transmitter and the receiver are 25 m and 63 m, respectively.

In FIG. 7 we compare the performance of three different exemplary embodiments and systems: (1) one pressure-only Tx and one pressure-only Rx, (2) one pressure-only Tx and one vector sensor Rx, and (3) one dipole at Tx and one vector sensor at Rx (an exemplary embodiment in FIG. 5). For all the three systems, the parameter L in every dipole is chosen to be $0.2\lambda$. Overall, simulation demonstrates the feasibility of the proposed method of certain exemplary embodiments of the present invention, i.e., transmission of signals via vector components of the acoustic field, such as but not limited to velocity channels, using vector sensors such as but not limited to dipoles, at the transmit side. The receive side can have either scalar sensors or vector sensors or both.

FIG. 8 shows the performance of one dipole at Tx and one vector sensor at Rx (an exemplary embodiment of the present invention in FIG. 5) at different transmission ranges. One of ordinary skill in the art would appreciate more simulation results are available.

Examples of Other Configurations Such as Tripoles, Etc.

As mentioned earlier in this document, vector components of an acoustic field may be modulated for data transmission using other configurations, which become apparent to one skilled in the art when the description of the preferred embodiments of the invention herein is taken in conjunction with the accompanying drawings. For example, instead of using $g'(z) = [g(z+\Delta)-g(z-\Delta)]/(2\Delta)$, $\Delta \to 0$, to compute pressure gradient, i.e., the acoustic velocity, one may use $g'(z) = [-3g(z)+4g(z+\Delta)-g(z+2\Delta)]/(2\Delta)$. This means applying $-3$ s, $-4$ s and $-s$ to elements #1, #5 and #2 in FIG. 9, at the transmit side, respectively.

To compute pressure second gradient, to modulate data on acoustic acceleration, one may use $g''(z)=[g(z-\Delta)-2g(z)+g(z+\Delta)]/\Delta^2$. This means applying s, −2 s and s to elements #1, #5 and #2 in FIG. 9, at the transmit side, respectively. The signal measured by the receive element #5 in FIG. 9 is proportional to the acoustic acceleration in z direction, whereas the signal measured by the receive element #5 in FIG. 5 is proportional to the acoustic velocity in z direction, as shown in Eq. (5). Moreover, the signal measured by the receive dipole in FIG. 9, composed of elements #1 and #2, is proportional to the gradient of acoustic acceleration in z direction, whereas the signal measured by the same dipole in FIG. 5 is proportional to the gradient of acoustic velocity in z direction, as shown in Eq. (4).

Those of ordinary skill in the art may make modifications in the embodiments described above (without departing from the spirit or scope of the present invention), using other differentiation rules such as, but not limited to, first-order, second-order, third-order and higher-order derivatives, and/or derivatives of non-integer order (fractional derivatives) in conjunction with transmit and/or receive vector sensors such as, but not limited to, vertical and/or horizontal and/or oblique dipoles, tripoles, quadrupoles, etc., in two dimensions, three dimensions, etc.

Example of a Multiuser Case

Here we present an example of a multiuser system with space-time block codes that utilize the vector components of the acoustic field. In some embodiments only scalar sensors are used for data transmission, whereas in this document we show how this can be done using vector sensors, by modulating data on the vector components of the acoustic field such as, but not limited to, acoustic velocity, acoustic acceleration, etc.

As shown in FIG. 10, there are three users in the system (extension to more users can be done by one skilled in the art using the description provided herein). Each user modulates data on y and z velocity channels using Alamouti code. Each velocity channel is stimulated by a dipole vector sensor (other devices may also be used). Since a three channel receiver can separate up to three users in a space-time block coded system, the vector sensor receiver in FIG. 10 can successfully recover the data of each user. The advantage of this proposed system is that it uses velocity channels at transmitter, which results in smaller transmitters, compared to the arrays of spatially separated scalar sensors for each user.

1) Single User System

First consider a single user system, where the user modulates data on y and z velocity channels in a frequency-selective acoustic channel and the receiver has K receive channels. The Alamouti encoder maps each pair of blocks $s_i(u)$ and $s_{i+1}(u)$ with length u into the transmission matrix X at time index i $$X = \begin{pmatrix} s_i(u) & -s_{i+1}^*(u) \\ s_{i+1}(u) & s_i^*(u) \end{pmatrix}. \quad (11)$$

This means at time index i blocks $\{s_i(u), s_{i+1}(u)\}$ are modulated on z and y velocity channels and at time index i+1 blocks $\{-s_{i+1}^*(u), s_i^*(u)\}$ are modulated on z and y velocity channels, respectively.

Since y velocity channel is modulated by the horizontal dipole in FIG. 10 whereas the z velocity channel is modulated by the vertical dipole, the received blocks $y_{i,k}$ and $y_{i+1,k}$ by the k-th channel of the receiver are given in Eq. (12), in the presence of noise $$y_{i,k}(h_{1k}-h_{2k})\oplus s_i + (h_{3k}-h_{4k})\oplus s_{i+1} + n_{i,k},$$

$$y_{i+1,k} - (h_{1k}-h_{2k})\oplus s_{i+1}^* + (h_{3k}-h_{4k})\oplus s_i^* + n_{i+1,k}, \quad (12)$$

where $\oplus$ stands for convolution and $h_{1k}$, $h_{2k}$, $h_{3k}$, and $h_{4k}$ represent the channel response between transmit sensors #1, 2, 3, 4 to the receiver channel k, with the maximum channel memory v. Eq. (12) stands for signals transmitted via velocity channels. We zero-pad all the four channel responses to length v, such that the received block length is v+u−1. Each channel response can be written in the form of a circulant matrix $$H_{1k} = \begin{pmatrix} \begin{pmatrix} h_{1k}(0)- \\ h_{2k}(0) \end{pmatrix} & 0 & \cdots & \begin{pmatrix} h_{1k}(v-1)- \\ h_{2k}(v-1) \end{pmatrix} & \cdots & \begin{pmatrix} h_{1k}(1)- \\ h_{2k}(1) \end{pmatrix} \\ \vdots & \ddots & \ddots & \ddots & \ddots & \vdots \\ \begin{pmatrix} h_{1k}(v-2)- \\ h_{2k}(v-2) \end{pmatrix} & \cdots & \begin{pmatrix} h_{1k}(0)- \\ h_{2k}(0) \end{pmatrix} & 0 & \cdots & \begin{pmatrix} h_{1k}(v-1)- \\ h_{2k}(v-1) \end{pmatrix} \\ \begin{pmatrix} h_{1k}(v-1)- \\ h_{2k}(v-1) \end{pmatrix} & \begin{pmatrix} h_{1k}(v-2)- \\ h_{2k}(v-2) \end{pmatrix} & \cdots & & \begin{pmatrix} h_{1k}(0)- \\ h_{2k}(0) \end{pmatrix} & 0 & \cdots \\ \vdots & \ddots & \ddots & \ddots & \ddots & \vdots \\ 0 & 0 & \begin{pmatrix} h_{1k}(v-1)- \\ h_{2k}(v-1) \end{pmatrix} & 0 & \cdots & \begin{pmatrix} h_{1k}(0)- \\ h_{2k}(0) \end{pmatrix} \end{pmatrix}, \quad (13)$$

$$H_{2k} = \begin{pmatrix} \begin{pmatrix} h_{3k}(0)- \\ h_{4k}(0) \end{pmatrix} & 0 & \cdots & \begin{pmatrix} h_{3k}(v-1)- \\ h_{4k}(v-1) \end{pmatrix} & \cdots & \begin{pmatrix} h_{3k}(1)- \\ h_{4k}(1) \end{pmatrix} \\ \vdots & \ddots & \ddots & \ddots & \ddots & \vdots \\ \begin{pmatrix} h_{3k}(v-2)- \\ h_{4k}(v-2) \end{pmatrix} & \cdots & \begin{pmatrix} h_{3k}(0)- \\ h_{4k}(0) \end{pmatrix} & 0 & \cdots & \begin{pmatrix} h_{3k}(v-1)- \\ h_{4k}(v-1) \end{pmatrix} \\ \begin{pmatrix} h_{3k}(v-1)- \\ h_{4k}(v-1) \end{pmatrix} & \begin{pmatrix} h_{3k}(v-2)- \\ h_{4k}(v-2) \end{pmatrix} & \cdots & & \begin{pmatrix} h_{3k}(0)- \\ h_{4k}(0) \end{pmatrix} & 0 & \cdots \\ \vdots & \ddots & \ddots & \ddots & \ddots & \vdots \\ 0 & 0 & \begin{pmatrix} h_{3k}(v-1)- \\ h_{4k}(v-1) \end{pmatrix} & 0 & \cdots & \begin{pmatrix} h_{3k}(0)- \\ h_{4k}(0) \end{pmatrix} \end{pmatrix},$$

To eliminate the inter-block interference, a cyclic prefix of length (v−1) may be added to each transmitted block s. Rewriting Eq. (12) in the matrix form results in $$\begin{pmatrix} y_{j,k} \\ y_{j+1,k}^* \end{pmatrix} = \begin{pmatrix} H_{1k} & H_{2k} \\ H_{2k}^* & -H_{1k}^* \end{pmatrix} \begin{pmatrix} s_i \\ s_{i+1} \end{pmatrix} + \begin{pmatrix} n_{j,k} \\ n_{j+1,k}^* \end{pmatrix}. \quad (14)$$

By applying the N-point orthogonal discrete Fourier transform (DFT) matrix with the (p,q)-th element as $$Q(p, q) = \frac{1}{\sqrt{N}} \exp\left(-jpq\frac{2\pi}{N}\right)$$

to both sides of Eq. (14) we obtain $$Y_k = \begin{pmatrix} Y_{j,k} \\ Y_{j+1,k}^* \end{pmatrix} = \begin{pmatrix} \Phi_{1k} & \Phi_{2k} \\ \Phi_{2k}^* & -\Phi_{1k}^* \end{pmatrix} \begin{pmatrix} S_i \\ S_{i+1} \end{pmatrix} + \begin{pmatrix} N_{j,k} \\ N_{j+1,k}^* \end{pmatrix}, \quad (15)$$

where $S_i = Qs_i$, $N_{j,k} = Qn_{j,k}$, $Y_{j,k} = Qy_{j,k}$, $\Phi_k = QH_kQ^\dagger$ is characterized by a diagonal matrix and $\dagger$ denotes complex conjugate transpose.

One may use the minimum mean squared error (MMSE) joint decoupler and equalizer at the receiver, where the MMSE estimator of $S_i$ is given by $$\hat{S}_i = \left(\Lambda_k^\dagger \Lambda_k + \frac{1}{SNR}I\right)^{-1} \Lambda_k^\dagger Y_k \text{ and } \Lambda_k \begin{pmatrix} \Phi_{1k} & \Phi_{2k} \\ \Phi_{2k}^* & -\Phi_{1k}^* \end{pmatrix}.$$

The bit error rate (BER) performance of the system with a single user (user 1 in FIG. 10), transmitting data using the vertical and horizontal dipoles, is shown in FIG. 11. To recover the Alamouti coded data, one signal at the vector sensor receiver of FIG. 10 is needed, which could be either the pressure signal measured by sensor #5, or the z-velocity signal measured by the vertical dipole {1,2}, or the y-velocity signal measured by the horizontal dipole {3,4}. The three different BER curves in FIG. 11 correspond to the three signals that may be measured at the receive side (the average of these three curves is also plotted). The simulation parameters are the same as those used earlier is this document, with a coarse silt bottom. The user is transmitting space-time block coded BPSK symbols with a bit rate of 2400 bits/sec. Symbols inside the block s are equi-probable ±1 iid symbols, and the block size is 200.

Correlations between the channels in Eq. (12) in this simulation study are given by cov(pz$_d$, py$_d$)=0.31, cov(pz$_d$, pz$_{dz}$)=0.0666, cov(pz$_d$, pz$_{dy}$)=0.5546, cov(pz$_d$, py$_{dz}$)=0.1529, cov(pz$_d$, py$_{dy}$)=0.6781, cov(py$_d$, pz$_{dz}$)=0.8560, cov(py$_d$, pz$_{dy}$)=0.2802, cov(py$_d$, py$_{dz}$)=0.5757, cov(py$_d$, py$_{dy}$)=0.3440, cov(pz$_{dz}$, py$_{dz}$)=0.3137, cov(pz$_{dy}$, py$_{dy}$)=0.0676, cov(pz$_{dz}$, py$_{dy}$)=0.1126, cov(pz$_{dz}$, pz$_{dy}$)=0.1710, cov(py$_{dz}$, py$_{dy}$)=0.1513 and cov(py$_{dz}$, pz$_{dy}$)=0.4363. Here pz$_d$, pz$_{dz}$, pz$_{dy}$ denote the channel responses from the z-direction transmit dipole to the pressure sensor, z and y dipoles at the receiver. Moreover, py$_d$, py$_{dz}$ and py$_{dy}$ denote the channel responses from the y-direction transmit dipole to the pressure sensor, z and y dipoles at the receiver.

2) Multiuser System

We define $$\Lambda_k^m = \begin{pmatrix} \Phi_{1k} & \Phi_{2k} \\ \Phi_{2k}^* & -\Phi_{1k}^* \end{pmatrix}, \quad (16)$$

such that $\Lambda_k^m$ is an Alamouti-like frequency domain channel response matrix from m-th user to k-th receiver, where m=1, 2 ... M and k>M. The property that $\Lambda_k^m \Lambda_k^{m\dagger}$ is a diagonal matrix enables the receiver to recover data of each user through simple linear operation on Y. For a multiuser system, the input-output system equation is given by $$Y = \begin{pmatrix} Y_1 \\ Y_2 \\ \vdots \\ Y_K \end{pmatrix} = \begin{pmatrix} \Lambda_1^1 & \Lambda_1^2 & \cdots & \Lambda_1^M \\ \Lambda_2^1 & \Lambda_2^2 & \cdots & \Lambda_2^M \\ \vdots & \vdots & \ddots & \vdots \\ \Lambda_K^1 & \Lambda_K^2 & \cdots & \Lambda_K^M \end{pmatrix} \begin{pmatrix} S^1 \\ S^2 \\ \vdots \\ S^K \end{pmatrix} + \begin{pmatrix} N_1 \\ N_2 \\ \vdots \\ N_K \end{pmatrix}. \quad (17)$$

For the three user example shown in FIG. 10, each user is transmitting data using two dipoles, and the receiver is a vector sensor that measures three signals: the pressure signal measured by sensor #5, the z-velocity signal measured by the vertical dipole {1,2}, and the y-velocity signal measured by the horizontal dipole {3,4}. The system input-output equations in the frequency domain can be rewritten as $$\begin{pmatrix} Y \\ Y_y \\ Y_z \end{pmatrix} = \begin{pmatrix} P_d^1 & P_d^2 & P_d^3 \\ P_{dy}^1 & P_{dy}^2 & P_{dy}^3 \\ P_{dz}^1 & P_{dz}^2 & P_{dz}^3 \end{pmatrix} \begin{pmatrix} S^1 \\ S^2 \\ S^3 \end{pmatrix} + \begin{pmatrix} N_1 \\ N_2 \\ N_3 \end{pmatrix}, \quad (18)$$

where $P_d^m$, $P_{dy}^m$ and $P_{dz}^m$ denote Alamouti-like frequency domain channel response matrices of the m-th user, measured by pressure, y-velocity and z-velocity sensors of the vector sensor receiver.

Using an MMSE joint decoupler and equalizer at the receiver, the BER performance of the system with three users is shown in FIG. 12. The BER of each single user and the average BER over the three users are all plotted. The three users in FIG. 10 are located at depths 25, 35 and 45 m. Other simulation parameters are the same as the ones in the single user system.

Even though the multiuser system explained above is built upon space-time block codes for interference cancellation, other multiuser systems such as code division multiple access (CDMA), direct sequence spread spectrum (DSSS), frequency hopping spread spectrum (FHSS), those that work based on channels codes, error corrections codes, etc., may be used by people of ordinary skill in the art, in conjunction with the embodiments described above, maybe with some modifications, without departing from the spirit or scope of the present invention.

Referring now to FIG. 13, the exemplary transmitting sensor, a quadrupole, is shown in FIG. 13. It is a piezoelectric (piezoceramic) ring with four poles (elements or electrodes or segments), hence, a quadrupole. It operates as two dipoles: one composed of elements no. I and II, and the other composed of elements no. III and IV. The two dipoles at the left end of FIG. 9 of the specification symbolically represent the quadrupole in FIG. 13. Similarly, upon rotating the coordinate system of the transmit sensor in FIG. 2 of the specification by 90 degrees, counterclockwise, such that the y axis becomes vertical, we again observe two dipoles there that symbolically represent the quadrupole in FIG. 13.

To transmit two data s1 and s2, using the exemplary embodiment of FIG. 13, the data s1 and s2 are modulated on z and y velocity components (two non-scalar components of the acoustic field). This is done by applying s1 and −s1 to elements (electrodes or poles or segments) no. I and II, respectively, and s2 and −s2 to elements no. III and IV, respectively. This may allow to use two differential amplifiers to amplify two data.

As shown in FIG. 14, To transmit three data s1, s2 and s3, using the exemplary embodiment of FIG. 14, s1+s3, −s1−s3, s2−s3, and −s2+s3 are applied to elements no. I, II, III and IV, respectively. While s1 and s2 are modulated on two dipoles similar to those shown in FIG. 13, s3 is FIG. 14 is modulated on a dipole whose one pole is composed of elements {I,IV} and its other pole is composed of elements {II,III}. This may allow to use two differential amplifiers to amplify three data. Other variations are also possible, e.g., apply s1+s3, −s1+s3, s2−s3, and −s2−s3 to elements no. I, II, III and IV, respectively.

There are other ways to transmit three data s1, s2 and s3. For example, apply s1+s3, −s1+s3, s2+s3, and −s2+s3 to elements no. I, II, III and IV, respectively, as shown in FIG. 15. While s1 and s2 are modulated on two dipoles similar to those shown in FIG. 13, s3 is FIG. 15 is modulated on the single-pole full ring, composed of elements {I,II,III,IV}. This modulates the data s3 on scalar pressure component. One may also transmit four data s1, s2, s3 and s4, by applying them to elements no. I, II, III and IV, respectively.

The common ground or ground connection in FIG. 13-15 is considered to be the outer element (electrode or pole or segment) and data or signals are applied to the inner elements. One may also consider the inner element as the common ground and apply data or signals to the outer elements. This means either the inside or the outside of the ring or cylinder in the exemplary transmitting quadrupole sensors of FIGS. 13-15 can be divided into at least four elements (electrodes or poles or segments). Both inside and outside of the ring or cylinder in the exemplary transmitting quadrupole sensors of FIGS. 13-15 can be divided into multiple elements (electrodes or poles or segments).

In addition to a ring or cylinder to implement dipoles, other geometrical shapes may be considered for the transmitting sensor, to operate as at least one dipole. For example, one may use a sphere, as shown in FIGS. 16-17c, with various element (electrode or pole or segment) configuration choices: 8 elements inside (4 on lower hemisphere and 4 on upper hemisphere) and 1 element outside for the common ground; or, 8 elements outside (4 on lower hemisphere and 4 on upper hemisphere) and 1 element inside for the common ground; or, 8 elements inside and 8 elements outside; or, other numbers of elements inside and outside of the sphere.

The transmitting sensor is not limited to FIGS. 13-15, or the above-mentioned exemplary sphere, or piezoelectric or piezoceramic materials or technologies, and other transmitting sensors or transmitters or actuators or electromechanical or electrochemical or electroacoustical transducers or projectors having other configurations or shapes or encapsulations or other number of poles, or built using other technologies, or made of other materials, e.g., magnetostrictive materials or electrostrictive materials, can be used. The transmitting sensor can be, but is not limited to, capacitive, inductive, or combinations thereof. The transmitting sensor can be, but is not limited to, a ring, free-flooded ring, sphere, moving coil, multi-mode, variable reluctance, piezoelectric 31 or 33 mode ring; or piston type such as tonpilz or hybrid; or transmission-line type such as sandwich, wideband, large plate or composite; or flextensional type such as class iv, vii, i Barrel Stave, v or vi, astroid, trioid, or x-spring; or flexural type such as bender bar, bender disc, slotted cylinder or bender mode x-spring; or modal type such as power wheel, octoid or leveraged cylindrical; or low profile piston type such as cantilever mode piston or shear mode piston.

It is noted that the methods and systems described thus far and/or described later in this document may be achieved by utilizing any of the known technologies, such as standard digital circuitry, analog circuitry, any of the known processors that are operable to execute software and/or firmware programs, programmable digital devices or systems, programmable array logic devices, DSP (digital signal processing) processors, or any combination of the above. One or more embodiments of the invention may also be embodied in a software program for storage in a suitable storage medium and execution by a processing unit.

Overall, although the systems and methods of the present invention have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention.

What is claimed is:

1. A method of communication, comprising:
providing a communication system operating in a material medium, the communication system comprising a first sensor and at least one second sensor;
transmitting, concurrently, at least two different data and/or signals in a same band through the material medium, using the first sensor with the first sensor being dedicated to the at least two different data and/or signals; and
receiving the at least two different data and/or signals using the at least one second sensor;
wherein the first sensor is a transmitting approximate ring with at least two poles, a transmitting approximate cylinder with at least two poles or a transmitting approximate sphere with at least two poles, and
wherein the transmitting approximate ring, the transmitting approximate cylinder or the transmitting approximate sphere is configured to generate vibrations.

2. The method of claim 1 wherein the material medium is a fluid.

3. The method of claim 1 wherein the first sensor operates as at least one dipole.

4. The method of claim 1 wherein the first sensor is at least one quadrupole.

5. The method of claim 1 wherein the first sensor is at least one quadrupole and the at least one second sensor is selected from a group consisting of: at least one quadrupole, at least one approximate sphere with at least one pole, and at least one scalar sensor.

6. The method of claim 5 wherein the first sensor and the at least one second sensor are made of piezoelectric or piezoceramic materials.

7. The method of claim 1 further comprising a third sensor configured to transmit data, wherein the first sensor and the third sensor independently belong to at least two users to transmit the at least two different data and/or signals through the material medium, independently and/or cooperatively.

8. The method of claim 1 wherein the at least two data and/or signals comprise two data and/or signals.

9. The method of claim 1 wherein the at least two data and/or signals comprise three data and/or signals.

10. A communication system comprising:
- a first transmitting sensor operating in a material medium and operable to concurrently transmit at least two different data and/or signals in a same band and the first transmitting sensor being dedicated to the at least two different data and/or signals, and
- at least one receiving sensor operable to receive the at least two different data and/or signals,
- wherein the first transmitting sensor is a transmitting approximate ring with at least two poles, a transmitting approximate cylinder with at least two poles or a transmitting approximate sphere with at least two poles, and
- wherein the transmitting approximate ring, the transmitting approximate cylinder or the transmitting approximate sphere is configured to generate vibrations.

11. The system of claim 10 wherein the material medium is a fluid.

12. The system of claim 10 wherein the first transmitting sensor operates as at least one dipole.

13. The system of claim 10 wherein the first transmitting sensor is at least one quadrupole.

14. The system of claim 10 wherein the at least one receiving sensor is at least one approximate sphere with at least one pole.

15. The system of claim 10 wherein the first transmitting sensor is at least one quadrupole and the at least one receiving sensor is selected from a group consisting of: at least one quadrupole, at least one approximate sphere with at least one pole, and at least one scalar sensor.

16. The system of claim 15 wherein the first transmitting sensor and the at least one receiving sensor are made of piezoelectric or piezoceramic materials.

17. The system of claim 10 further comprising a third sensor configured to transmit data, wherein the first transmitting sensor and the third sensor independently belong to at least two users to transmit the at least two different data and/or signals through the material medium, independently and/or cooperatively.

18. The system of claim 10 wherein the at least two data and/or signals comprise two data and/or signals; or the at least two data and/or signals comprise three data and/or signals.

19. A method of communication, comprising:
- providing a communication system operating in a material medium, the communication system comprising at least one transmitting sensor and at least one receiving sensor;
- modulating at least one data on at least one non-scalar component of acoustic field,
  - wherein the at least one data comprises one of: i) at least one altered and at least one unaltered data form, or ii) more than one altered data forms,
  - wherein the at least one data is applied to at least two inputs of the at least one transmitting sensor,
  - wherein the at least one transmitting sensor is at least one transmitting approximate ring with at least two poles, at least one transmitting approximate cylinder with at least two poles or at least one transmitting approximate sphere with at least two poles, and
  - wherein the at least one transmitting approximate ring, the at least one transmitting approximate cylinder or the at least one transmitting approximate sphere is configured to generate vibrations,
  - wherein the at least one non-scalar component comprises at least a velocity component, an acceleration component, or a higher-order component, or a combination thereof, along at least one of a x axis, a y axis, a z axis, or a combination thereof;
- transmitting, using the at least one transmitting sensor, the at least one data; and
- receiving, using the at least one receiving sensor, the at least one data.

\* \* \* \* \*